US012197825B2

(12) United States Patent
Radaelli et al.

(10) Patent No.: US 12,197,825 B2
(45) Date of Patent: Jan. 14, 2025

(54) COMPUTER-IMPLEMENTED METHOD FOR THE PROBABILISTIC ESTIMATION OF A PROBABILITY OF FAILURE OF A COMPONENT, A DATA PROCESSING SYSTEM, A COMPUTER PROGRAM PRODUCT AND A COMPUTER-READABLE STORAGE MEDIUM

(71) Applicant: Siemens Energy Global GmbH & Co. KG, Munich (DE)

(72) Inventors: Francesco Radaelli, Duisburg (DE); Christian Amann, Bottrop (DE); Kai Kadau, Lake Wylie, SC (US); Sebastian Schmitz, Berlin (DE); Markus Vöse, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 930 days.

(21) Appl. No.: 17/288,948

(22) PCT Filed: Oct. 31, 2019

(86) PCT No.: PCT/EP2019/079850
§ 371 (c)(1),
(2) Date: Apr. 27, 2021

(87) PCT Pub. No.: WO2020/089402
PCT Pub. Date: May 7, 2020

(65) Prior Publication Data
US 2021/0383035 A1 Dec. 9, 2021

Related U.S. Application Data

(60) Provisional application No. 62/753,954, filed on Nov. 1, 2018.

(51) Int. Cl.
*G06F 30/20* (2020.01)
*G06F 30/13* (2020.01)
G06F 111/08 (2020.01)
G06F 119/02 (2020.01)

(52) U.S. Cl.
CPC .............. *G06F 30/20* (2020.01); *G06F 30/13* (2020.01); *G06F 2111/08* (2020.01); *G06F 2119/02* (2020.01)

(58) Field of Classification Search
CPC .......... G06F 30/00; G06F 30/20; G06F 30/13; G06F 2111/08; G06F 2119/02
USPC .......................................................... 703/2, 1
See application file for complete search history.

(56) References Cited

U.S. PATENT DOCUMENTS

| | | | | |
|---|---|---|---|---|
| 9,280,620 B2* | 3/2016 | Amann | ................... | G06F 30/23 |
| 9,841,756 B2* | 12/2017 | Patel | ....................... | G06F 30/00 |
| 2012/0130688 A1* | 5/2012 | Jiang | ..................... | F01D 21/003 |
| | | | | 703/2 |

FOREIGN PATENT DOCUMENTS

| | | | | |
|---|---|---|---|---|
| CN | 110083984 A | * | 8/2019 | ......... G06F 17/5009 |
| WO | WO-2015200158 A1 | * | 12/2015 | ............... G01L 1/00 |
| WO | 2016191068 A1 | | 12/2016 | |

OTHER PUBLICATIONS

Makkonen, M., "Predicting the Total Fatigue Life in Metals", Dec. 25, 2008, International Journal of Fatigue 31, Elsevier Ltd. (Year: 2008).*

(Continued)

*Primary Examiner* — Cedric Johnson
(74) *Attorney, Agent, or Firm* — Wolter Van Dyke Davis, PLLC

(57) ABSTRACT

A computer-implemented method for probabilistic quantification of probability of failure of a component, especially a gas turbine component, which during operation is subjected to cyclic stress, wherein the component is divided virtually in one or more domains. The method includes: providing or (Continued)

determining for at least one domain, a domain probability density function for crack initiation and providing or determining for the considered domains a domain probability density function for subsequent crack propagation induced failure. Determining for each considered domain a combined domain cumulative distribution function for failure or its probability density function is done by convoluting either both the considered domain probability density functions for crack initiation induced failure and the respective domain probability density function for subsequent crack propagation induced failure, or their integral function. Alternatively, numerical methods for said component failure probabilities include domain-based Monte-Carlo schemes.

16 Claims, 15 Drawing Sheets

(56) References Cited

OTHER PUBLICATIONS

Meng et al: "Prediction of optimal inspection time for structural fatigue life"; International Journal of Fatigue; Elsevier; Amsterdam; NL; vol. 29, No. 8; Mar. 30, 2007; pp. 1516-1522; XP022009589; ISSN: 0142-1123; DOI:10.1016.

Okada K et al: "Statistical fatigue properties of nonferrous metals based on the statistical aspect of crack initiation and propagation behaviors". Database Inspec [Online] the Institution of Electrical Engineers, Stevenage, GB; Jan. 2001 (Jan. 2001), XP002797875; 2001 [ English abstract attached].

Zhang J et al: "A probabilistic estimation method of multiple site damage occurrence for aircraft structures"; Procedia Engineering; Elsevier; Amsterdam; NL; vol. 2, No. 1; Apr. 1, 2010; pp. 1115-1124; XP027034594; ISSN: 1877-7058.

Makkonen et al: "Predicting the total fatigue life in metals"; International Journal of Fatigue; Elsevier; Amsterdam, NL, vol. 31, No. 7; Jul. 1, 2009; pp. 1163-1175; XP026035826; ISSN: 0142-1123, DOI: 10.1016/J.IJFATIGUE.2008.12.008.

Liu et al: "Multiaxial fatigue reliability analysis of railroad wheels", Reliability Engineering and System Safety, Elsevier Applied Science, GB, vol. 93, No. 3, Oct. 22, 2007 (Oct. 22, 2007), pp. 456-467, XP022308640, ISSN: 0951-8320, DOI:10.1016.

PCT International Search Report and Written Opinion of International Searching Authority mailed Aug. 11, 2020 corresponding to PCT International Application No. PCT/EP2019/079850 filed Oct. 31, 2019.

British Standards Institution, "Guide on methods for assessing the acceptability of flaws in structures", BS7910: 2019, BSI, London, pp. A/1-A/7.

* cited by examiner min. stress          max. stress min. stress          max. stress

COMPUTER-IMPLEMENTED METHOD FOR THE PROBABILISTIC ESTIMATION OF A PROBABILITY OF FAILURE OF A COMPONENT, A DATA PROCESSING SYSTEM, A COMPUTER PROGRAM PRODUCT AND A COMPUTER-READABLE STORAGE MEDIUM

CROSS REFERENCE TO RELATED APPLICATIONS

This application is the US National Stage of International Application No. PCT/EP2019/079850 filed 31 Oct. 2019, and claims the benefit thereof. The International Application claims the benefit of U.S. Provisional Application No. 62/753,954 filed 1 Nov. 2018. All of the applications are incorporated by reference herein in their entirety.

FIELD OF INVENTION

The present invention relates to a computer-implemented method for the probabilistic estimation of a probability of failure of a component, a data processing system, a computer program product and a computer-readable storage medium.

BACKGROUND OF INVENTION

Engine or building components of a technical systems can during operation be subjected to stresses that change over time in magnitude and/or frequency. These stresses can occur in form of both, mechanical and/or thermal stress, that alter the material or a preexisting flaw to a nucleating crack. Alteration of the material is often related to the surface region of the component whereas preexisting flaws are mostly located inside the component's material being hard to detect. These flaws, also known as manufacturing imperfections, are results of manufacturing processes like forging, casting or generative approaches. In detail these flaws can represent non-metallic inclusions, a discontinuity of the matrix or the like. Nevertheless, manufacturing related defects can also be related to the surface. Examples include surface imperfections such as scratches, dents, and roughness. Also, service induced alterations due to cyclic or static loading can initiated inside the component. The details of which depend on the type of material, manufacturing procedures, treatments, etc. The presented methods are not restricted to a specific type of defect and their respective location.

It was already acknowledged in the late 1980s and 1990s that the rare occurrence of manufacturing anomalies of forged aero engine rotor disks cannot be assessed in a deterministic approach. Consequently, a probabilistic fracture mechanics approach was developed by the aero-engine community, including the Federal Aviation Administration, in the early 1990s to address rare anomalies in titanium alloy rotor disks. Southwest Research Institute collaborated with the aero-engine community to implement the methodology and software tool called DARWIN (Design Assessment of Reliability with Inspection). It accounts during each cycle, typically a start and shutdown of an engine or another change of operating condition, these small cracks propagate incrementally depending on the stresses, the temperature, the structure, and material of the component to such an extent, that the component fails, sometimes with potential of catastrophic consequences.

Nowadays it is known that the crack initiation is usually driven by low cycle fatigue (LCF), high cycle fatigue (HCF), thermo-mechanical fatigue (TMF), creep crack initiation, oxidation, etc. or any combination thereof, while the crack growth is based on fatigue crack growth, creep crack growth, oxidation assisted crack growth etc. or any combination thereof.

One of the most important processes regarding crack initiation is fatigue crack initiation, especially for components subjected to the cyclic stresses as mentioned above. This process is traditionally described by Woehler curves—oftentimes as isothermal LCF or HCF processes. Additionally, descriptions for TMF, in which the complex interactions between mechanical and thermal load changes is dominant, can be important also. TMF is in particular for combustion engines—such as gas turbines (GT)—of high importance. The aforementioned processes have a number of cycles $N_{INIT}$ to crack initiation associated with them.

Gas turbine components for the energy sector, such as turbine blades and rotor disks, are also exposed to extreme operating conditions. Safe and reliable operation requires robust component life prediction methodologies for a variety of materials and failure mechanisms. Unavoidable forging flaws in heavy-duty gas turbine rotor components are challenging to describe with engineering methods. Forged components are therefore conservatively designed, and their lifetime is calculated using fracture mechanics (FM), under the assumption that the flaw is a sharp crack with a dimension that can be deduced by non-destructive evaluation like ultrasonic testing (UT). This assumption is restrictive, because flaws are typically not sharp cracks and experience first a crack nucleation or initiation phase from a material imperfection. The terms nucleation and initiation are used interchangeably.

The mere existence of those initiated small cracks typically does usually not compromise the structural integrity of the component. Oftentimes the subsequent fatigue crack growth process (or creep crack growth or any other type of crack growth as described by fracture mechanics)—until the crack becomes so large that the component fails—has a significant number of cycles $N_{FM}$ associated with them as well.

Failing the component can mean that the crack becomes so large that the crack becomes unstable and uncontrolled crack growth to failure occurs. This situation can occur if the crack's stress intensity K exceeds the fracture toughness $K_{1C}$ of the material. The component can also be considered as being failed if under steady engine operation conditions, the crack size is large enough to allow for growth under HCF amplitude loading (i.e. $\Delta K > \Delta K_{threshold}$, with $\Delta K$ being the stress intensity difference between maximum and minimum amplitude, and $\Delta K_{threshold}$ being the respective threshold value below which no crack growth occurs), as HCF cycles that would lead to failure accumulate quickly and fail the component. Alternative to the aforementioned failure conditions, a failure can also be defined in other ways. For instance, in an engine casing or pressure vessel a certain amount of leakage could be defined as failure criterion. The latter might lead to an operating regime and location dependent critical flaw size.

The total number of cycles to failure is then the sum of the two aforementioned subsequent processes:

$$N_{Fail} = N_{CI} + N_{CPF} \qquad \text{eq. (1)}.$$

where $N_{Fail}$ is the total lifetime of the component or a region in cycles, split into a nucleation part $N_{CI}$ or $N_{Nuc}$ and a crack propagation part $N_{CPF}$. The crack propagation part $N_{CPF}$ can also be mentioned as $N_{FM}$, when mainly induced by a fracture mechanics part.

This total number of cycles to component failure $N_{Fail}$ is relevant for deterministic lifing determinations and the contribution from both considered processes can be comparable or—depending on material, component, and location—one or the other can dominate. However, it should also be noted that the two processes—crack initiation and crack growth—are not clearly distinguishable and are only a result of the engineering description and measurement of those processes. In reality both continuously transit from nucleation processes into crack growth. Also, the involved processes for crack initiation can be based on cycles, time, or a combination thereof. One example would be a time-based creep induced crack initiation with a subsequent cycle-based fatigue crack growth. Therefore, the term "cycle" in this document is representative for both countable events like start- and/or stop-events of an engine and/or timewise continuing events like continuous operation of an engine.

In a deterministic description of the process both contributions can be calculated and subsequently added according to eq. (1).

However, in a probabilistic calculation the process is not as straight forward as the processes are intertwined. Separately calculated failure distributions for both processes cannot be simply added in order to obtain a probability of failure (PoF) for the whole process resp. for the whole component.

Therefore, there is a need for an estimation procedure on how to quantify the risk of failure of a component dedicated being subjected to cyclic stress considering both aforementioned processes: crack initiation and subsequent crack propagation.

SUMMARY OF INVENTION

The object of the present invention is to provide an improved method for probabilistic estimation of a probability of failure of a component PoF(n), especially a gas turbine component, designated for being subjected to cyclic stress. The total probability of failure PoF(n) considers both the failure criteria of crack initiation and crack propagation.

The above objects are achieved by the features of each independent claim. Further advantageous developments are provided by the dependent claims.

The invention proposes a computer-implemented method for probabilistic estimation of probability of failure PoF(n) of a component, especially a gas turbine component, which during operation is subjected to cyclic stress,
wherein the component is divided virtually in one or more domains,
the method comprising the steps of:
a. providing or determining for at least one domain, preferably for each domain, a domain probability density function for crack initiation $PDF^{CI}_i(n)$ and
providing or determining for the considered domains
a domain probability density function for subsequent crack propagation induced failure $PDF^{CPF}_i(n)$,
b. b1) determining for each considered domain
a combined domain probability density function for failure $PDF^{Fail}_i(n)$ according to $$PDF^{Fail}_i(n) = PDF^{CI}_i(n) \times PDF^{CPF}_i(n),$$

wherein
X designates the convolution operator between the two PDFs,
and
b2) determining for each considered domain
a combined domain cumulative distribution function for failure $CDF^{Fail}_i(n)$ based on the respective combined domain probability density function for failure $PDF^{Fail}_i(n)$,
wherein
CDF is a cumulative distribution function of the PDF,
OR
b3) determining for each considered domain
a domain cumulative distribution function for crack initiation $CDF^{CI}_i(n)$ and cumulative distribution function for subsequent crack propagation induced failure $CDF^{CPF}_i(n)$ based on the respective domain probability density functions for crack initiation $PDF^{CI}_i(n)$ and subsequent crack propagation induced failure $PDF^{CPF}_i(n)$,
and
b4) determining for each considered domain
a combined domain probability density function for failure $CDF^{Fail}_i(n)$ according to $$CDF^{Fail}_i(n) = \frac{d}{dn}(CDF^{CI}_i(n) X CDF^{CPF}_i(n)) \qquad \text{eq. (3)}$$

wherein
$CDF^{CI}_i(n)$ designates the domain cumulative distribution function for crack initiation,
$CDF^{CPF}_i(n)$ designates the domain cumulative distribution function for subsequent crack propagation induced failure,
X designates the convolution operator between the two CDFs,
c. if only one domain is considered, determining the total probability of failure PoF(n) of the component according to $$PoF(n) = CDF^{Fail}_i(n); \text{ with } i=1 \qquad \text{eq. (4)}$$

or
if two or more domains are considered, determining the total probability of failure PoF(n) of the component according to $$PoF(n) = CDF^{Fail} = 1 - \Pi_{i=1}^{N}[1 - CDF^{Fail}_i(n)] \qquad \text{eq. (5)}$$

In this document the terms i) a probability density function (PDF), also known as "probability distribution" and ii) a cumulative distribution function (CDF), wherein CDF is the integral of the PDF, have to be understood in their context: The abbreviations CI, CPF, Fail, n and i used in combination with abbreviations PDF and CDF in the description and in the drawings shall indicate the meaning of the latter regarding CI=crack initiation/crack nucleation, CPF=subsequent crack propagation induced failure, Fail=combined crack initiation and subsequent crack propagation induced failure, n=cycle or time (or any combination thereof), depending on described failure mode, and i=an individual domain of a number of domains N, when no other meaning is indicated.

The inventors recognized that convoluting either the cumulative distribution function $CDF^{CI}(n)$ for crack initiation and $CDF^{CPF}(n)$ for subsequent crack propagation induced failure in the manner described in eq. (3), their respective probability density functions $PDF^{CI}(n)$ and $PDF^{CPF}(n)$, combinations of PDF and CDF as described below.

In other words: the present invention combines a first, a probabilistic crack initiation model and a second, a probabilistic subsequent crack growth to failure model in a new way. To improve the existing probabilistic life quantification methods, the invention describes a scheme that convolutes the local crack initiation resp. nucleation probability and the local crack growth failure probability to provide a local failure probability. Integration over the whole component then yields the total probability of failure for the component under a specific load spectrum. The framework can be applied to a variety of sequential failure processes including static and fatigue loading phenomena, as well as a multiplicity of failure modes and sequences relevant for engineering components.

Basically, either or both the domain probability density function for crack initiation $PDF^{CI}_i(n)$ and/or the domain probability density function for subsequent crack propagation induced failure $PDF^{CPF}_i(n)$ could be either determined in the conventional way by mathematical or simulation model quantification based on intensive and comprehensive testing of material probes or the like. Or, in cases were no appropriate data about the component, its behavior and/or its material is available, the respective functions PDFs/CDFs could also be estimated based on service or expert experience, or the like.

The following is a technical explanation on the convolution processes and their relation to combined failure probability: The summation in eq. (1) in the deterministic (or scalar) representation translates into a convolution operation for the respective probability density functions in the probabilistic representation as expressed in eq. (2). This convolution approach describes the total probability of failure for the combined and assumed to be independent processes of crack initiation and subsequent growth. This means that the $PDF^{CPF}$ is the same for all locations in this domain. This is the reason why the approach is based on domains and voxels that can provide sufficient resolution in this respect. For convolution on the basis of cumulative distribution functions CDF, or a mixture of CDF and PDF, see the following mathematical description:

$$CDF_{CI}(n) = \int_0^n PDF_{CI}(v)dv \qquad \text{eq. (6)}$$

and $$CDF_{CPF}(n) = \int_0^n PDF_{CPF}(v)dv \qquad \text{eq. (7)}$$

then $$CDF_{Fail}(n) = \int_0^n (PDF_{CI} \times PDF_{CPF})(v)dv \qquad \text{eq. (8)}$$
$$= (CDF_{CI} \times PDF_{CPF})(n) = (PDF_{CI} \times CDF_{CPF})(n)$$
$$= \frac{d}{dn}(CDF_{CI} \times CDF_{CPF})(n)$$

with following definition of convolution starting from zero cycles:

$$(f \times g)(n) = \int_0^n f(v)g(n-v)dv \qquad \text{eq. (9)}$$

The inventors recognized that a convolution embedded in a Monte-Carlo (MC) Scheme as described in independent claim 2 leads also finally to a precise estimation of failure probability of a component $CDF^{Fail}(n)$ which during operation is subjected to different loadings. Hence, with the invention especially LCF-based crack initiation could be combined with FM-based crack propagation to quantify the risk of component failure, i.e. liberation. The Monte-Carlo Scheme according claim 2 is a numerical determination method for said total component failure probability.

An advantage of the presented invention is to provide a methodology and tool that allow for to quantify the risk of failure of components in service that exhibit a crack initiation process such as LCF/TMF/HCF/creep crack initiation, oxidation driven crack initiation, etc. and any combination thereof followed by a crack propagation process until failure. A failure can be fatigue crack growth, creep crack growth, oxidation assisted crack growth etc. or any combination thereof.

The aforementioned risk of failure quantification allows to exploit a components capability in service until the risk of failure gets too high and the associated expected costs of a failure is larger than the business advantage of the component in service.

Besides this, and according to the invention and if indicated, not for each domain the probabilities of failure have to be determined. Assuming that all domains together covers the whole component, it could be sufficient that only for these domains—in the following called considered domains—the proposed method is applied where a substantial risk of failure exists. An indication for ignoring one or multiple domains is given, when in advance for this or these domains no risk of failure or a significant low risk of failure could be determined. Skipping these domains means that no calculations have to be performed in that regard. This accelerates the operating time of the method significantly.

This allows to design components for specific targets. In example components supporting an increased efficiency of a system, e.g. a gas turbine, can be designed or for an optimization of service strategies including outages and part or component exchanges. A classical deterministic design cannot quantify the risk of operating that component at this level, independently if the component is still in the design phase design or already under operation.

Preferably, by positioning the location for fracture in the worst-case location for fracture mechanics within each domain, an upper bound for the total probability of failure is obtained which converges to the true probability of failure for a large number of domains.

An example for a typical probability density function PDF that is applied for failure assessments of parts, components or systems is the Weibull distribution. However, the approach descripted here is not limited to this distribution. Further, the definition of domains has to be understood as a virtual division of the component into one or more areas, from which at least one, preferably all of them are considered according to the steps described herein.

As mentioned above, the same result can be achieved by the features of independent claim 2, in which the convolution is designed in an approach embodied as an addition of cycles to failure for selected domain i of N domains and for a sample j of S Monte-Carlo-Samples. Here, the computer-implemented method for probabilistic estimation of probability of failure PoF(n) of a component, especially a gas turbine component, which during operation is subjected to cyclic stress, comprises the steps of:

dividing the component virtually in one or more domains i, wherein N is the number of domains, providing data regarding material of the component, its structure and regarding the loading of the component, defining a number S of Monte-Carlo-Samples j for a Monte-Carlo-Simulation providing nested loops, in particular an outer loop and an inner loop, to traverse the domains N and the Monte-Carlo-Samples S, wherein in particular the outer loop traverses through the one of both samples S and domains N and the inner loop traverses through the other of the both, determining within both the inner loop and the outer loop a crack initiation cycle to failure $N_{ij}^{CI}$, determining within both the inner loop and the outer loop a subsequent crack propagation cycle to failure $N_{ij}^{CPF}$ for domain i and for sample j, especially based on fracture mechanical properties drawn from respective distributions and considering stress/temperature and geometry of fracture location for domain j, calculating within both the inner loop and the outer loop the cycles to failure for domain i and sample j: $N_{ij}^{Fail} = N_{ij}^{CI} + N_{ij}^{CPF}$, determining minimum failure cycle of all domains for sample j, especially according to: if $$N_{ij}^{Fail} < N_{j}^{Fail} \text{set}$$

$$N_{j}^{Fail} = N_{ij}^{Fail},$$

and calculating the total probability of failure PoF(n) as a function of cycles n based on Sf(n)/S, wherein Sf(n)=Number of samples failed until cycle n.

Further, the step of defining of domains of the component comprises a definition of a number of domains of equally sized voxels. Said voxel-based approach combines local crack initiation probability with local crack propagation probability, especially local worst FM life within small volume (e.g. voxel). This rather fine regionally refined coupling requires most effort in a) designing the voxel structure and b) in calculation efforts of the computer but achieving the best results regarding the components probability of failure. If needed an automatic processing could be required that prevents manual applications of complex FM assessments. As the Monte-Carlo-Simulation usually requires frequent access of local properties of component, each time adjusted FEA (finite-element-analysis) could be too time consuming. Instead of updated FEAs a rather small number of predefined FEA-representations could be used for the calculations and be discretized and stored in the voxel representation of the component.

Alternatively to the voxel-approach the step of defining of domains of the component comprises a definition of a number of domains, wherein each domain represents a zone of different functions of the component. This zone-based approach is a compromise between the two extremes of components probability of failure calculations that are mentioned above, the global approach and the voxel-based approach. The zone-based approach, which is like the voxel approach also a local approach, combines in detail the crack initiation probability with crack propagation probability, especially of the worst FM life, within zones of interest. Hence, variable zone sizes can be selected enabling the detailed consideration of local critical features. Also, coarse or fine regionally refined coupling depending on zone size is possible. This approach provides best flexibility on costs of a manual process for defining and selecting the different zones. However, for different zones different crack initiation models and different crack propagation models can be incorporated. This should lead to a high-quality factor of the estimated probability of failure for the whole component achievable on a reasonable effort of both, dividing virtually the component into multiple domains, designing and programming the complete method and calculating the proposed convolution method by the computer.

According to a preferred embodiment the step of determining crack initiation data either for each considered domain a domain probability density function for crack initiation $PDF^{CI}i(n)$ or crack initiation cycle $Nij^{CPF}$ is based on at least of one of Low-Cycle fatigue (LCF), High-Cycle fatigue (HCF), Thermo-Mechanical fatigue (TMF), creep crack propagation or oxidation or the like or any combination thereof. Thus, for the determination of the probability density function for crack initiation $PDF^{CI}(n)$ different approaches can be selected. This determination of a domain probability density function for crack initiation $PDF^{CI}i(n)$ is indicated for components which have not been operated so far so that based on estimated operation conditions a number and distribution of virtual crack flaws have to be assumed in advance. Here it is beneficial when the whole component is divided virtually into multiple domains so that for the considered domain or for a group of domains being subjected to similar or identical loads and/or crack flaw data a best matching density function can be selected respectively. For components that have already been operated a non-destructive evaluation (NDE) based, e.g. by ultrasonic inspection, is possible for the determination of the domain probability density function for crack initiation $PDF^{CI}i(n)$.

In a further preferred embodiment wherein the step of determining for each considered domain a domain probability density function for crack initiation $PDF^{CI}i(n)$ is based on a stochastic distribution, especially a Weibull distribution, or on a result of a numeric simulation, especially a Monte-Carlo-Simulation. Thus, for the determination of the probability density function for subsequent crack propagation induced failure $PDF^{CPF}(n)$ different approaches can be selected. This makes most sense for components that are divided virtually into multiple domains so that for each considered domain or for a group of domains being subjected to similar or identical loads a best matching density function can be selected respectively. In other words: Especially, said Weibull distribution and Monte-Carlo simulations can depend on local, temperatures, material properties, stresses, and size/shape/type of a flaw if present, according to eq. (15) mentioned below.

In another preferred embodiment the step of determining crack propagation data either as each considered domain a domain probability density function for subsequent crack propagation induced failure $PDF^{CPF}i(n)$ or as crack propagation cycle $Nij^{CPF}$ considers at least one of crack growth and failure relevant material properties such as fatigue crack growth rate FCGR, creep crack growth rate CCGR, crack corrosion pitting, erosion rates, fracture toughness K1c, $\Delta K_{threshold}$, or tensile properties or any combination thereof with a failure criterion which can be based on at least one of stress intensity factor K exceeding the fracture toughness K1c, $\Delta K$ exceeding, stress intensity factor range $\Delta K$ exceeding a fatigue crack growth stress intensity range threshold $\Delta K_{threshold}$, a crack length exceeding a critical crack length or exceeding a safe region of a two parameter failure assessment diagram (FAD) based on properties listed above, especially based on the British R6 criteria which are based the two parameters load ratio Lr and the fracture ratio Kr. The British R6 criteria is defined by *British Standards Institution, Guide on methods for assessing the acceptability of flaws in structures, BS7910: 1997, BSI,* London. Applying especially the British R6 criteria leads to a reduced fracture toughness based on loading in that region related to tensile properties such as yield strength.

According to a preferred embodiment the step of defining domains of the component comprises a definition of single domain comprising the whole component. This rather coarse estimation by treating all areas of the whole component identically regarding flaw distribution, material properties, crack initiation and crack propagation probabilities, etc. reduces calculation time and provides a global approach for the quantified estimation of the component probability of failure as no regionally refined coupling is needed.

In another aspect the component is embodied as one of the group of rotor blade, guide vane, vane carrier, rotor disk, especially its hub region or attachment region for attaching rotor blade, casing components of either a gas turbine, of a steam turbine or of a generator or as a combustor transitions of a gas turbine. Of course and typically, the methods mentioned above can especially be used to estimate the total probability of failure of these components as they are subjected during operation continuously to multiple crack initiation and crack propagation effects for a very long period of time. I.e. these components are subjected to thermal stress that occur from heating the component from ambient temperature to operation temperature that often raises 1000° C. and more. Further some of these components are also subjected to centrifugal forces and/or aerodynamical forces that changes over time, sometimes with constant frequencies. Hence, the estimation of the total probability of failure of these components are beneficial. However, the application of the above-mentioned methods is not limited to only these components. Experiences have shown that this type of turbo-engine components and LCF-based probability density function for crack initiation and a TMF-based probability density function for crack propagation provides most often best fitting results, compared to the other estimations of lifetime of the component.

In another aspect a method for operating a component under cyclic stress, the method comprising scheduling a downtime or maintenance of said component considering a probability of failure PoF(n) of said component as estimated by a method according to one of the preceding claims. Hence, the results achieved by performing any of the methods mentioned above could be used for the determination of point of time, when parts or components, especially wear parts or components, shall be replaced by spare parts. The operational time of wear parts can be increased without increasing the probability of a failure of both, the component itself and its engine or system of which the component is part of.

In further aspect the crack initiation process considers surface related defects of the component and/or nucleating flaws located below the components surface. Hence, method proposed is applicable for all types of defects that can occur during the operational life of the component.

In another aspect a data processing system comprising means for carrying out the steps of the method of any of the above-described embodiments.

In another aspect a computer program product comprising instructions which, when the program is executed by a computer, cause the computer to carry out the steps of the method of any of the above-described embodiments.

In another aspect a computer-readable storage medium comprising instructions which, when executed by a computer, cause the computer to carry out the steps of the method of any of the above-described embodiments. Preferably, the computer-readable storage medium is a non-transitory computer-readable storage medium for storing the computer program durably.

BRIEF DESCRIPTION OF THE DRAWINGS

The present invention is further described hereinafter with reference to illustrated embodiments shown in the accompanying drawings, in which.

DETAILED DESCRIPTION OF INVENTION

Figure 1:
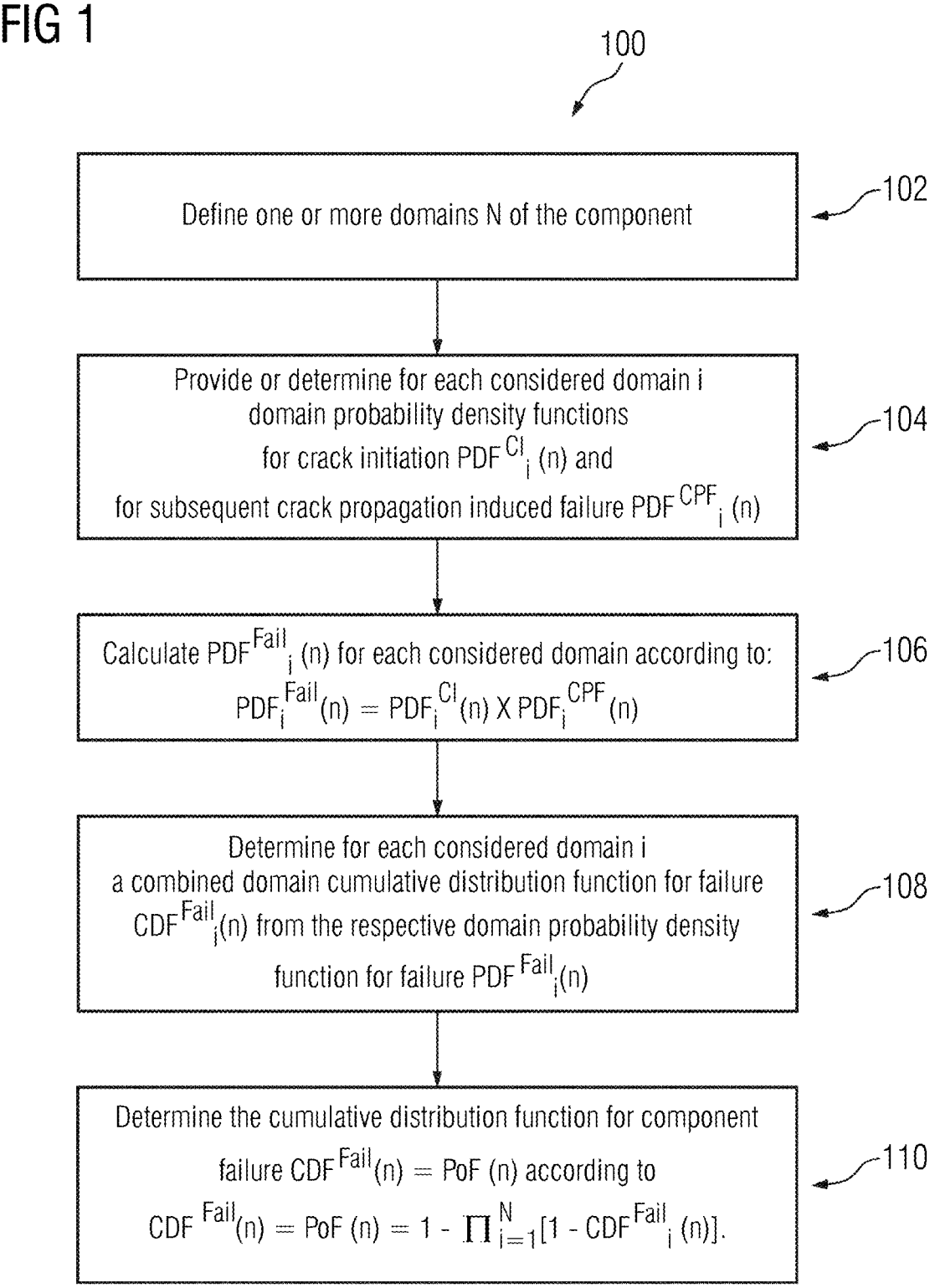
FIG. 1 is flowchart of a first exemplary embodiment of the invention.

FIG. 1 is a flowchart of a first exemplary embodiment of a computer-implemented method 100 for probabilistic estimation of probability of failure PoF(n) of a component, especially a gas turbine component, which during operation is subjected to cyclic stress. The computer-implemented method can be executed by a data processing system comprising appropriate means for carrying out and/or supporting one or more of steps of the invention. The first exemplary embodiment utilizes steps a), b1), b2) and c) of the invention.

According to the first exemplary embodiment in a first step 102 the user of the method defines in the computer one or more different areas of the component that are subject to different loadings, different crack flaws, different operation conditions, etc. The number of areas, in the following called domains, being selected and defined depend on the individual requirements of the user, as explained in detail with the aid of FIG. 3.

Figures 3, 4:
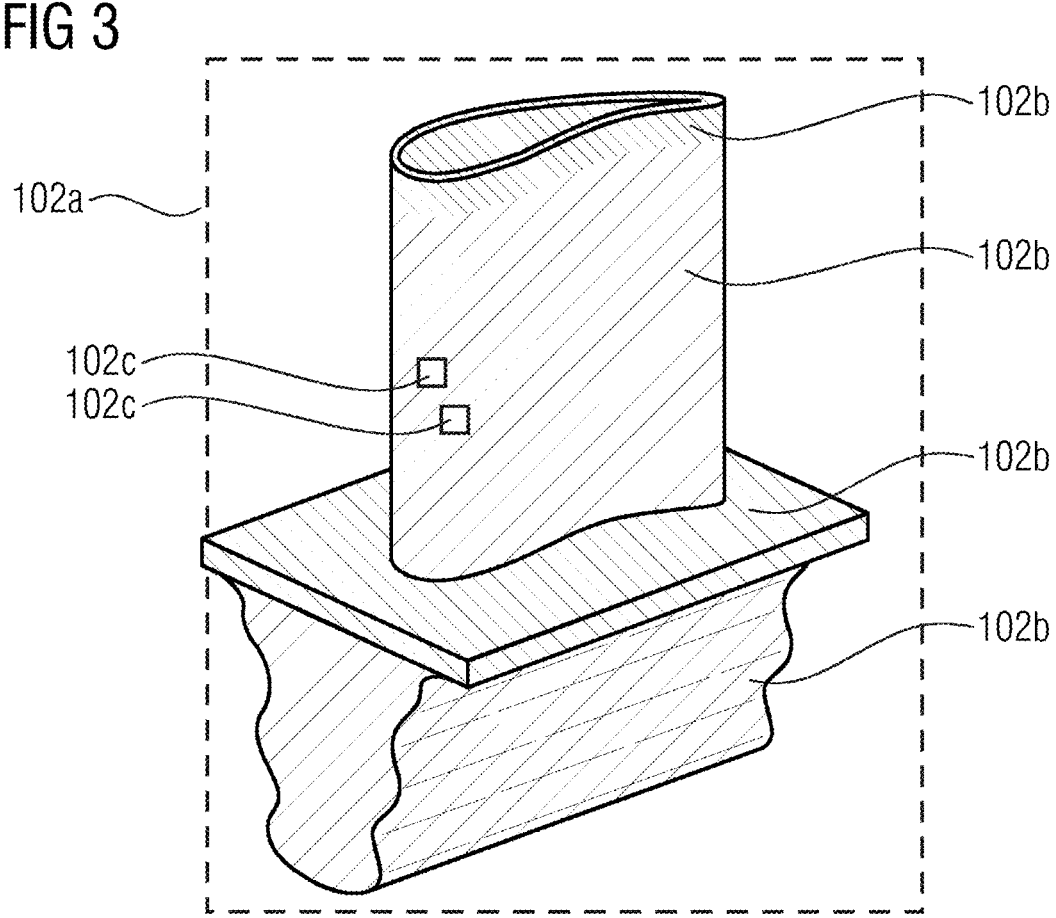
FIG. 3 is a schematic illustration of a turbine blade as an exemplary embodiment of a component, virtually divided into four domains.
FIG. 4 is a third exemplary embodiment of the invention based on a Monte-Carlo scheme and voxel representation of component.

FIG. 3 shows a turbine blade of a gas turbine as an exemplary component for which a probability of failure PoF(n) shall be determined. In a first approach the turbine blade could be considered as a single domain, so that a global approach 102a is made. This means that the same data, like crack flaw data, expected propagation rate, the stochastic distributions, thermal and mechanical load, etc. are applied for every part of the whole component. This is beneficial as fast computing results could be expected, however, with lower accuracy of the total failure probability estimation.

Instead of a global approach and according to a zone-based approach 102b the component could be divided virtually into a smaller number of domains. Crack flaw data, crack initiation and/or crack propagation, operational loads, etc. differs from zone to zone and it is assumed that within each zone these parameters are identical. Hence, for each zone the same calculation steps can be performed, however with different data. In the exemplary embodiment as shown in FIG. 3 four zones or domains are defined: the first two zones or domains comprise the tip and the remaining part of the airfoil of the turbine blade, the third zone or domain comprises only the platform and the fourth zone or domain comprises only the root of the turbine blade. In this example the zones are defined based on local regions of the component with identical functions.

Instead of this, the zones could also be defined based on regions that have similar features and/or based on specific symmetries, or the like. This zone-based approach balances the need of a more accurate assessment of the failure probability estimation and the effort for implementing and executing the methods described herein.

Most accurate but accompanied with most effort in designing and computing is a third approach, in which a larger number of voxels are defined as domains each representing a local volume of the component. The third approach is also called voxel-based approach 102c. A voxel, also known as volume pixel element, represents in a grid a two- or three-dimensional space, usually a square or a cube with a predetermined length of edges. Then, for each voxel the data i.e. crack flaw data, expected propagation rate, etc. and stochastic distribution, fracture toughness K1$_c$, etc. are to provide. It is self-explaining that the voxel-based approach is that approach in which one or more voxels could be omitted in the estimation process when these specific voxels can be identified in advance with lowest or no likelihood of failure.

Further, it is also possible that for each domain different FEA-meshes, different loading and/or operating conditions are applied, if suitable and indicated. Further, it is also possible to exclude single of multiple domains from consideration when expected that these regions are definitely not stressed enough that critical defects occur for all cycles n.

After the domains have been defined according to one of the approaches as mentioned above and turning back to FIG. 1, in step 104 the computer-implemented method determines for each considered domain, a domain probability density function PDF$^{CI}_i$(n) for crack initiation. In one example this could be done in a conventional manner. The crack initiation probability model at a given number of cycles for a whole component or a domain of said component can be described by a Weibull distribution $$F_N(n) = 1 - \exp\left[-\left(\frac{n}{\eta}\right)^m\right] \qquad \text{eq. (10)}$$

With the Weibull shape m being a material parameter, i.e. the scatter, and the Ndet being the local deterministically calculated life cycles to crack initiation the Weibull scale parameter η can be described e.g. by an integral over the relevant surface area A of the component, when crack formation in surface regions is mainly considered:

$$\eta = \left(\int_A \frac{1}{N_{det}^m} dA\right)^{-\frac{1}{m}} \qquad \text{eq. (11)}$$

The determined initiated cracks can either have a fixed assumed crack size (as measure from experiments) or a specific distribution of crack sizes and shapes. Note that eq. (11) is just one example, the type of distribution can be different including non-analytical distribution. Also, the integral might not be limited to a surface integration as described in eq. (11).

Further, the method determines for at least one domain, preferably for each domain, a domain probability density function for subsequent crack propagation induced failure PDF$^{CPF}_i$(n) as a second model. These determinations could be done in a conventional way, usually by the consideration of fracture mechanics, as exemplarily explained in the U.S. Pat. No. 9,280,620 B2 of Amann, Gravett, and Kadau, which complete content is herewith incorporated by reference. They described a probabilistic fracture mechanics approach which is using the Monte-Carlo methodology.

It is noted that the crack propagation relevant material properties such as fatigue crack grow rate (FCGR), fracture toughness K1c, tensile properties, etc. can also vary as described in the referenced patent. When the calculation of the PDF$^{CPF}_i$(n) is based on fracture mechanics considerations, this calculation requires a failure criterion which can the stress intensity factor K exceeding the fracture toughness K1c, or another threshold value such as fatigue crack growth stress intensity threshold K$_{th}$. Other failure criteria such as reaching a critical crack length can be applied as well.

In a next step 106 (FIG. 1) for each considered domain, preferably for all domains N, a combined domain probability density function for failure PDF$^{Fail}_i$(n) is determined (108) by convoluting both the domain probability density function for crack initiation PDF$^{CI}_i$(n) and domain probability density function for subsequent crack propagation induced failure PDF$^{CPF}_i$(n). Then, the combined domain probability of failure density PDF$^{Fail}_i$(n) is transformed in step 108 into a combined domain cumulative distribution function for failure CDF$^{Fail}_i$(n) by integration of the first.

If only one domain is defined or considered, then the calculated combined domain cumulative distribution function for failure $CDF^{Fail}_i(n)$, with i=1 represents already the total probability of failure PoF(n). This means that step 110 can be omitted.

Only if more than one domain is defined and considered, the component has to be considered fail when any of the considered domains N have failed. Therefore, subsequently all considered combined domain cumulative distribution function for failure $CDF^{Fail}_i(n)$ are utilized in the last step 110 for determining for each considered domain the total probability of failure PoF(n) according to the formula:

$$PoF(n)=1-\Pi_{i=1}^{N}[1-CDF^{Fail}_i(n)] \qquad \text{eq. (12)}$$

Figure 2:
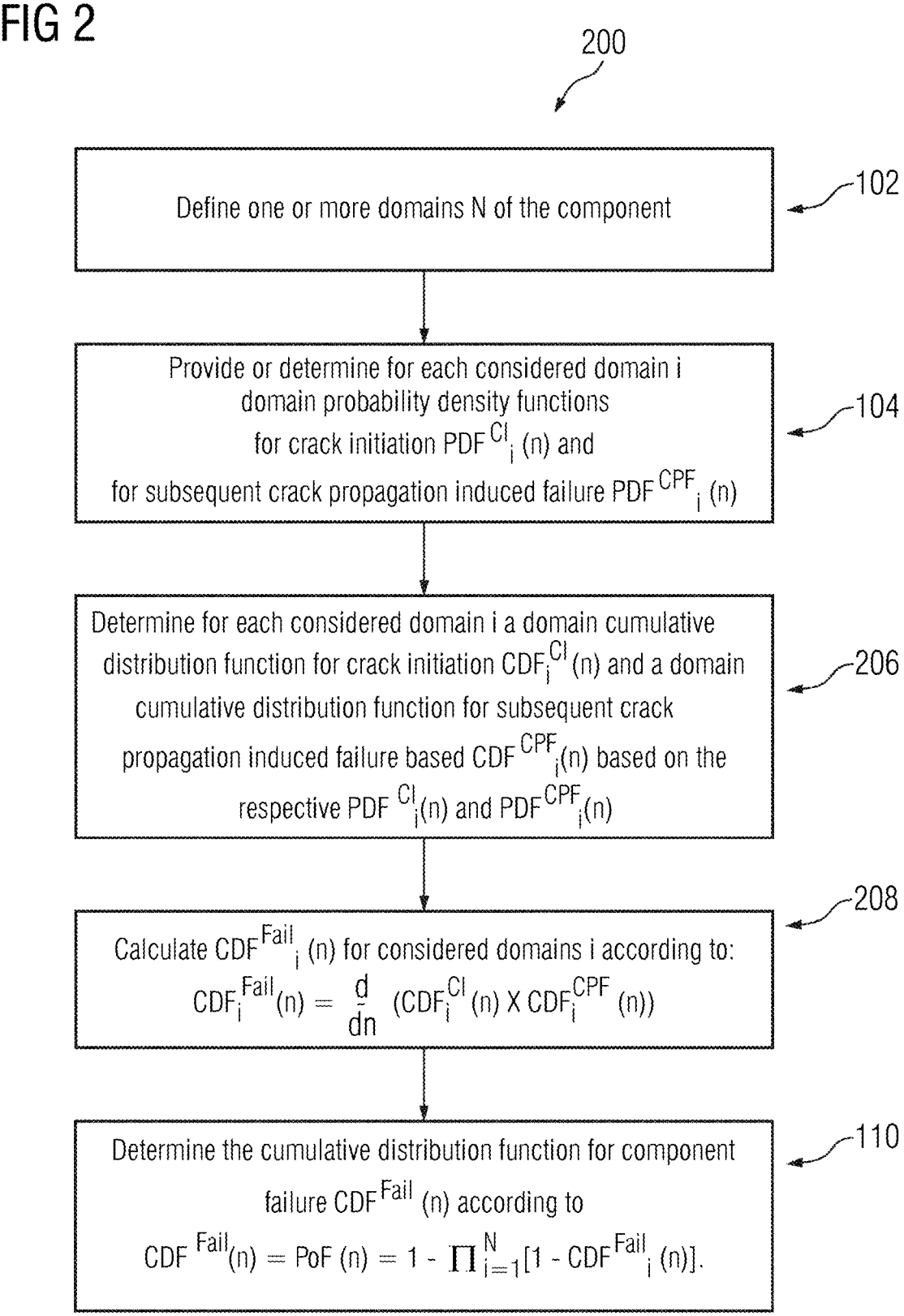
FIG. 2 is flowchart of a second exemplary embodiment of the invention.

A second exemplary embodiment 200 of the invention is depicted in FIG. 2 and utilizes steps a), b3), b4) and c) of the invention as defined above. According to FIG. 2, the sequence of convolution and of transforming the PDF(n) into the CDF(n) could be swapped. Hence, the same result could be achieved when first for at least one domain a domain cumulative distribution function for failure and for crack initiation $CDF^{CI}_i(n)$ and subsequent crack propagation induced failure $CDF^{CPF}_i(n)$ are determined based on the respective domain probability density functions $PDF^{CI}_i(n)$ and $PDF^{CPF}_i(n)$ 206, and then the convolution of the CDFs with subsequent differentiation with respect to cycles n is performed 208.

Figure 5:
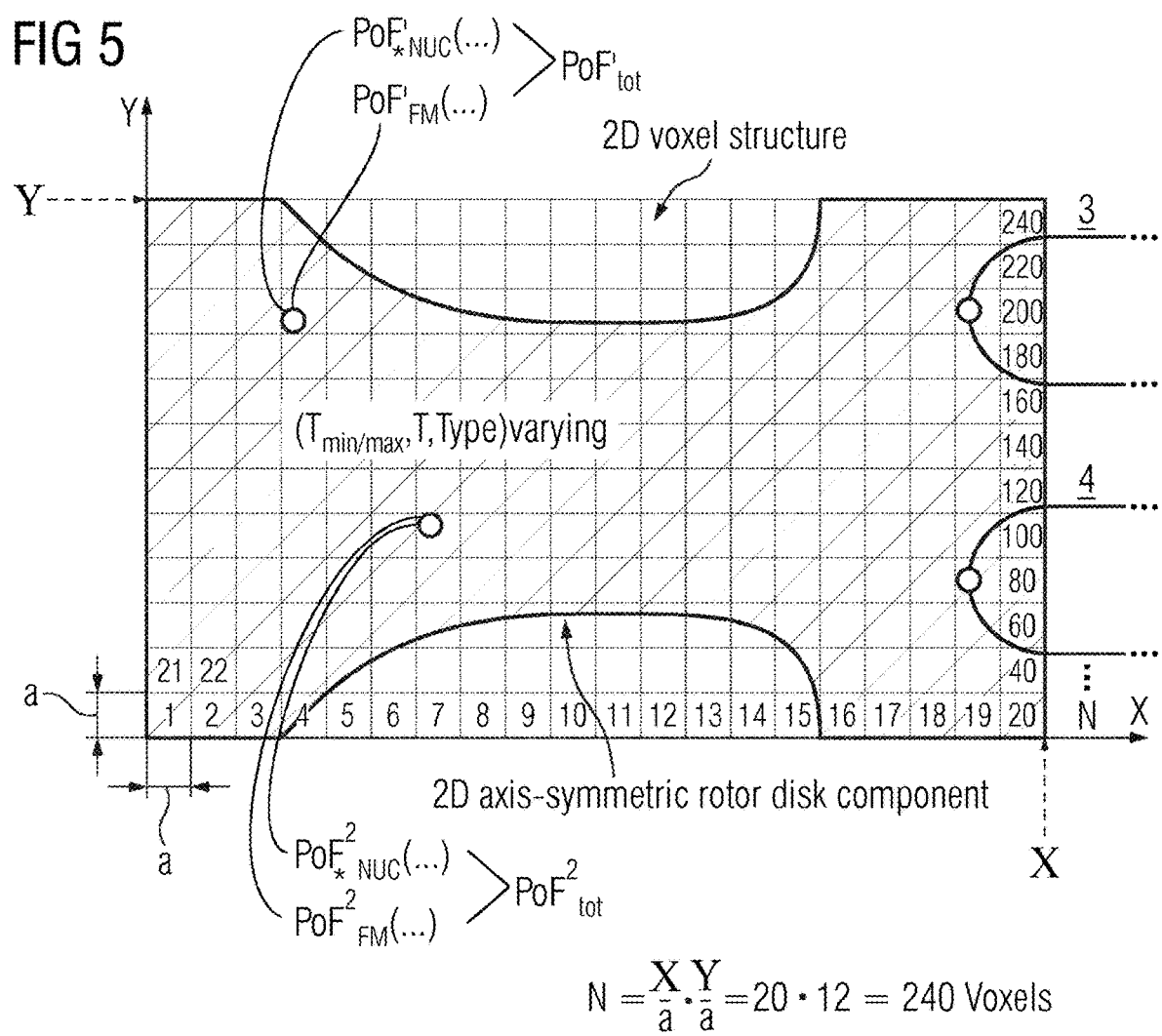
FIG. 5 is an example of a 2D-voxel representation of a gas turbine rotor disk.

FIG. 4 is a schematic de-composition of a generic component $\Omega$ into twelve voxels, whereas FIG. 5 is a more detailed example of a 2D-voxel representation in cartesian coordinate systems (X/Y) of a gas turbine rotor disk as an example of component for which the total probability of failure shall be determined. In FIG. 5 the cross section of the gas turbine rotor disc 130 is hatched. According to the example each voxel edge has a length A. The size of the gas turbine disk along y-axis is Y and along the x-axis is X, the number of 2D-voxels can be calculated to 240.

Figure 6:
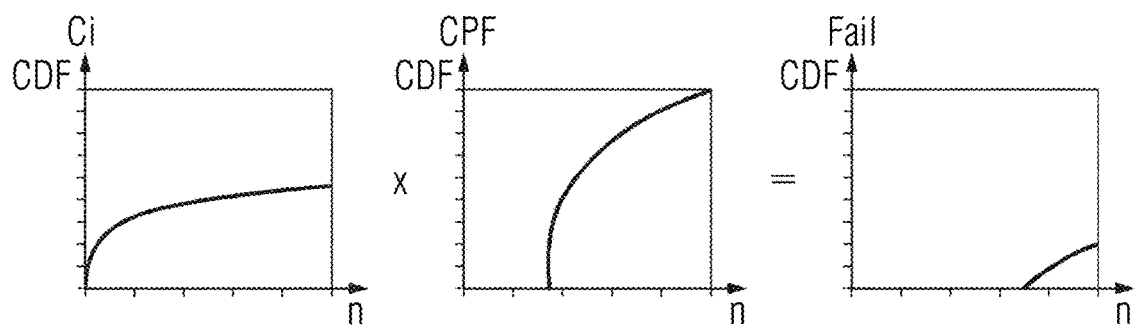
FIG. 6 shows three charts illustrating the convolution of domain cumulative distribution function for crack initiation $CDF^{CI}_i(n)$ and subsequent crack propagation induced failure $CDF^{CPF}_i(n)$ to a combined domain cumulative distribution function for failure $CDF^{Fail}_i(n)$.

An example of a convolution of a domain cumulative distribution function for crack initiation $CDF^{CI}_i(n)$ and for subsequent crack propagation induced failure $CDF^{CPF}_i(n)$ for a single domain is shown in FIG. 6. In this example the variable n represents the cycles, e.g. the number of starts of a gas turbine in which the turbine blade is embedded. For the considered domain it is assumed that the total probability of failure for crack initiation is based on a Weibull-distribution due to LCF. The graph of the left chart of FIG. 6 shows the cumulative distribution function of the domain cumulative distribution function crack initiation $CDF^{CI}_i(n)$ for. The chart for the same domain shown in the middle is the numerical fatigue crack growth as cumulative distribution function for subsequent crack propagation induced failure $CDF^{CPF}_i(n)$, which could be determined by a Monte-Carlo-Simulation. Both $CDF^{CI}_i(n)$ and $CDF^{CPF}_i(n)$ are combined by convolution and subsequent derivation wrt n according to eq. (3) to determine the combined domain cumulative distribution function for failure $CDF^{Fail}_i(n)$, which is displayed in the chart located at the right-hand side of FIG. 6.

Figure 7:
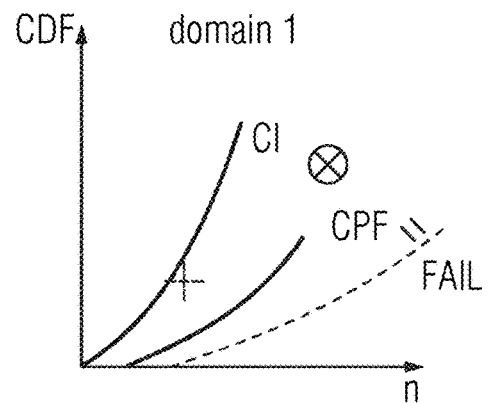
FIG. 7 shows schematically the graphs of FIG. 6 combined into a single chart, for a first domain.

What is shown in FIG. 6 for a first domain in three charts is combinedly shown in FIG. 7 in a single chart, however with graphs having a different shape than in FIG. 6. Both, the cumulative distribution function of the domain for crack initiation $CDF^{CI}_i(n)$ and the cumulative distribution function of the domain for subsequent crack propagation induced failure $CDF^{CPF}_i(n)$ are drawn in full line whereas the resulting combined domain cumulative distribution function for failure $CDF^{Fail}_i(n)$ is shown in dashed style.

Figure 8:
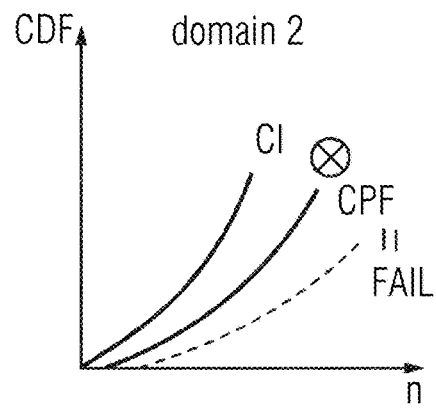
FIG. 8 shows schematically the graphs of FIG. 6 combined into a single chart, for a second domain.

FIG. 8 shows in principle the same chart as FIG. 7, but because of the different data that are applied for the determination of the combined domain cumulative distribution function for failure $CDF^{Fail}_i(n)$, the graphs for the second domain are different. The respective data are selected according to the load, stresses, material properties, crack flaw data, etc. as being relevant for the second domain.

Figure 9:
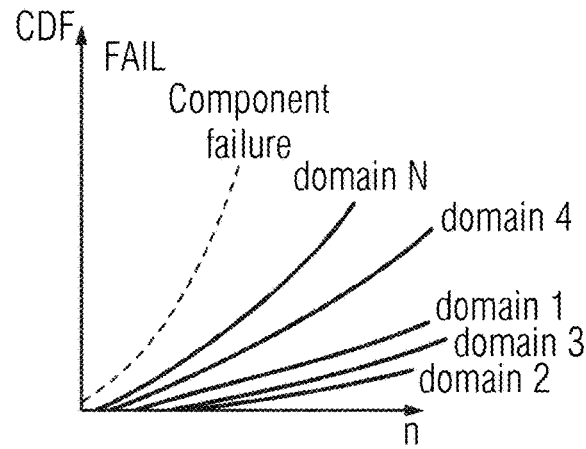
FIG. 9 shows schematically a chart displaying all determined domain probability density functions for failure $CDF^{Fail}_i(n)$ of all considered domains and the resulting probability density function for component failure $CDF^{Fail}(n)$.

Then FIG. 9 shows in one chart all combined domain cumulative distribution functions for failure $CDF^{Fail}_i(n)$ of all considered domains i, for i=1 to N, with N>1 which are all combined according to eq. (5) to compute the total probability of failure of a component PoF(n) represented in the dashed line.

Figure 10:
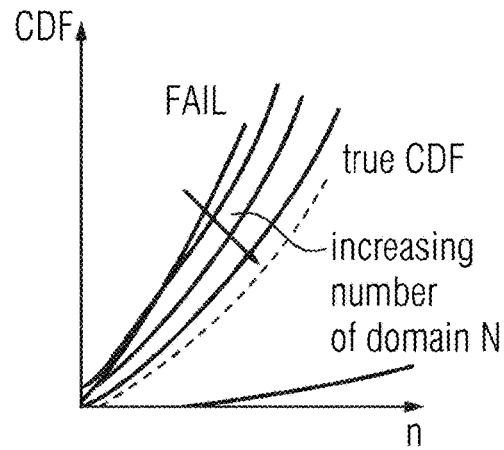
FIG. 10 shows schematically a chart illustrating decreasing $CDF^{Fail}(n)$ for an increasing number of domains.

FIG. 10 shows the dependency of the total probability of failure PoF(n) of a component from the number of considered domains. With increasing number of domains, as indicated by the arrow, a more accurate estimation for the total probability of failure PoF(n) of a component is achieved on costs of calculation time that the computer needs for performing the steps proposed. The dashed line represents the converged probability of failure PoF(n) of the component for a large number of domains.

Figure 11:
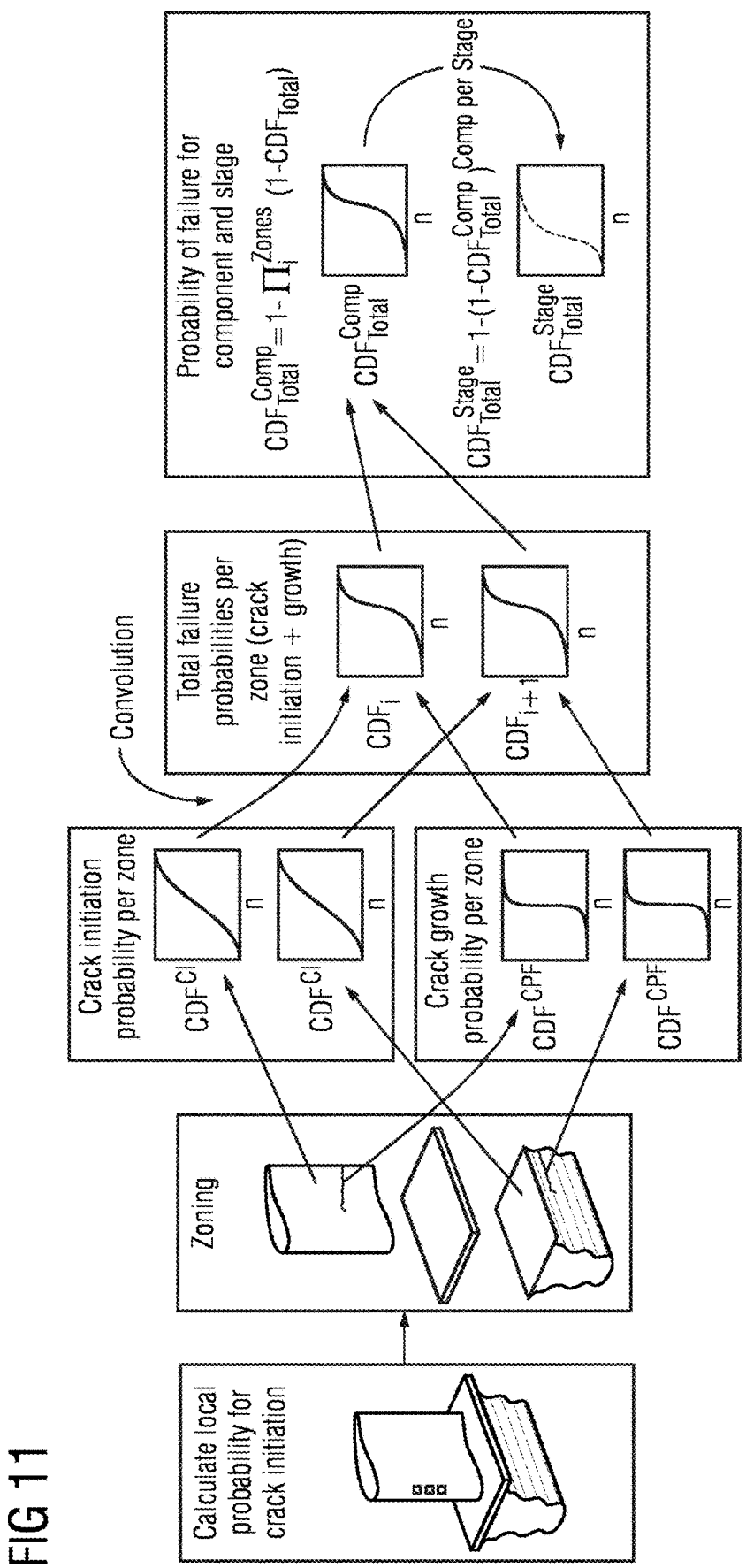
FIG. 11 shows schematically the exemplary embodiment of the invention with the aid of pictograms and FIG. 12 shows the two phases of the failure mechanism the crack nucleation and subsequent crack growth.

The whole procedure of which most is done by a computer, is shown again in FIG. 11 as exemplary embodiment of the invention with the aid of pictograms. According to this third exemplary embodiment of the method the turbine rotor blade is virtually separated into three domains (N=3), a first domain comprises the airfoil of the turbine rotor blade, the second domain comprises the platform and the third domain comprises the root of the turbine rotor blade. As the zone-approach is shown in FIG. 11, these domains could also be mentioned as zones. The domain representing the platform of the turbine blade is ignored in this example. Hence, only for two of the three zones, namely the airfoil and the root, the crack initiation probabilities and the crack propagation probabilities are determined, convoluted and further processed for the determination of the total probability of failure PoF(n) of the turbine blade. If needed, these data can also be used to determine a probability of failure of a turbine stage $PoF^{stage}(n)$ comprising of a number of identical not correlated components. Furthermore, the probability of failure for the whole engine $PoF^{Engine}(n)$ or a subsystem thereof $PoF^{System}(n)$, e.g. turbine can be quantified as well by calculating the individual component and stage probabilities.

The before-mentioned explanation of the invention was mainly directed to cracks newly formed in surfaces. In the following the invention will be explained in detail again for flaws in the material of the component, which are embedded below its surface. Only for the sake of easy in the following the first phase of failure mechanism, crack initiation, will be called crack nucleation in the following, without generating any differences.

Figure 12:
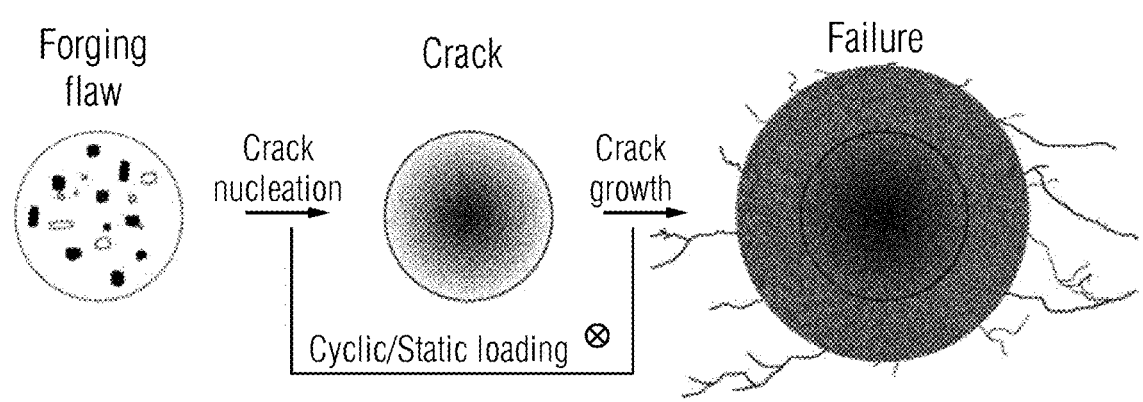

FIG. 12 shows again the two phases of the failure mechanism, now explained with aid of a material imperfection, e.g. a forging flow induced by a non-metallic inclusion. Under cyclic and or static loading the area of a non-metallic inclusions first nucleates into a crack before subsequent crack growth will lead to component failure. The crack growth part is typically described by engineering fracture mechanics. As the local lifetime of the component regarding crack nucleation $N_{Nuc}$ depends significantly on the type of flaw (inclusion, separation, etc.), which is typically unknown, the invention proposes to use a probabilistic model to describe the nucleation of the flaw into a crack.

The total local failure probability can then be described by the local convolution of the probability for nucleation and for fracture mechanics life as exemplary described in eq. (2) resp. eq. (3), accompanied by required calculations mentioned above, as indicated in step c).

The nucleation modeling process is a function of the number of cycles N, the applied min./max. stress $\sigma_{min}/\sigma_{max}$, the temperature T, the flaw size and geometry A and the flaw type. The total flaw nucleation probability over all flaw types can be calculated with a mean type occurrence rate $\rho_i$ with the following formula:

$$PoF_{Nuc}(N, \sigma, T, A) = \sum_{i=1}^{n} \frac{F_{Nuc}(N, \sigma, T, A)}{\rho_i} \quad \text{eq. (13)}$$

Eq. (3), (4) and (13) are applicable in the general case where no correlation between a) $N_{CI}$ and b) $N_{CPF}$ respectively $N_{FM}$ are expected. In this case a parameter m is defining the different flaw types which can occur within the material of the component, e.g. in a gas turbine rotor disc 130 (FIG. 4) and parameter i represent one of the domain N that is at present considered.

Figure 13:
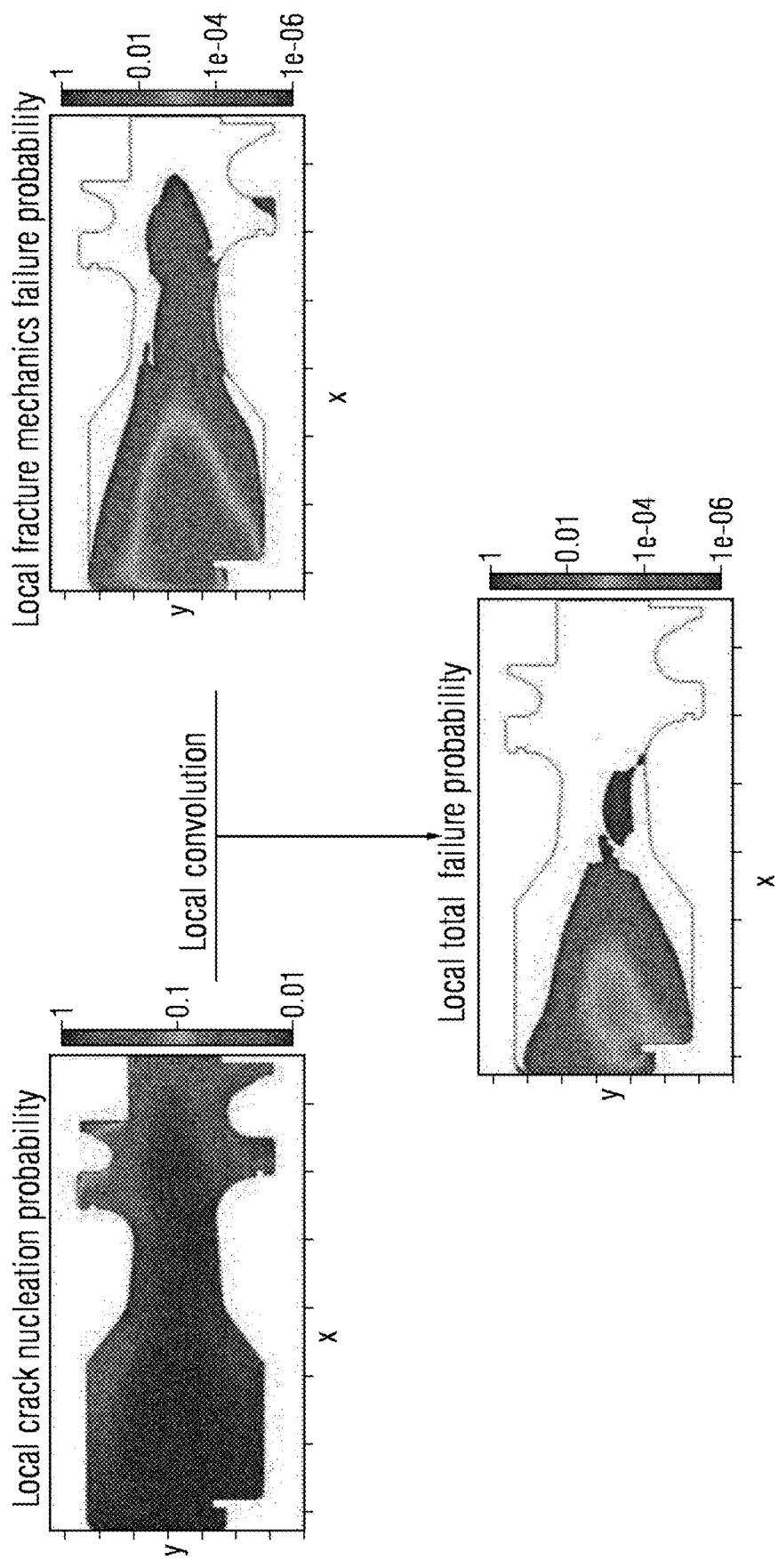
FIG. 13 shows two maps of local risks of a gas turbine rotor disc for different failure phases, that are convoluted to a resulting failure map.

FIG. 13 shows local risk maps of a gas turbine rotor disc 130 after a high number of cycles for local crack nucleation probability (which is a domain cumulative distribution function for crack initiation $CDF^{CI}_i(n)$), local fracture mechanics failure probability (which is a domain cumulative distribution function for subsequent crack propagation induced failure $CDF^{CPF}_i(n)$), and the resulting local total failure probability (which is the combined domain probability density function for $CDF^{Fail}_i(n)$) according to the invention. For the crack nucleation probability, a nucleation model $F_{Nuc}$ as expressed in eq. (13) has been determined and applied.

In FIG. 13 this approach is refined with a local crack nucleation model which accounts for the local stress and temperatures within the component. As can be seen the local combination of the crack nucleation probability and the fracture mechanics failure probability strongly depends on the local conditions and can significantly reduce the calculated overall risk in a non-homogeneous fashion.

Figure 14:
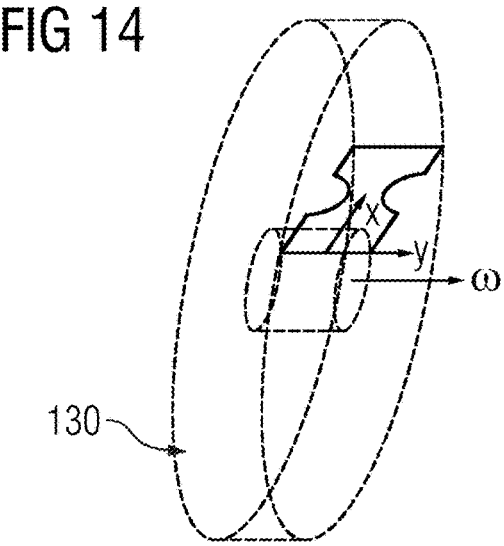
FIG. 14 shows a schematic of a heavy-duty rotor disk with a section from axis-symmetrical considerations.
Figure 15:
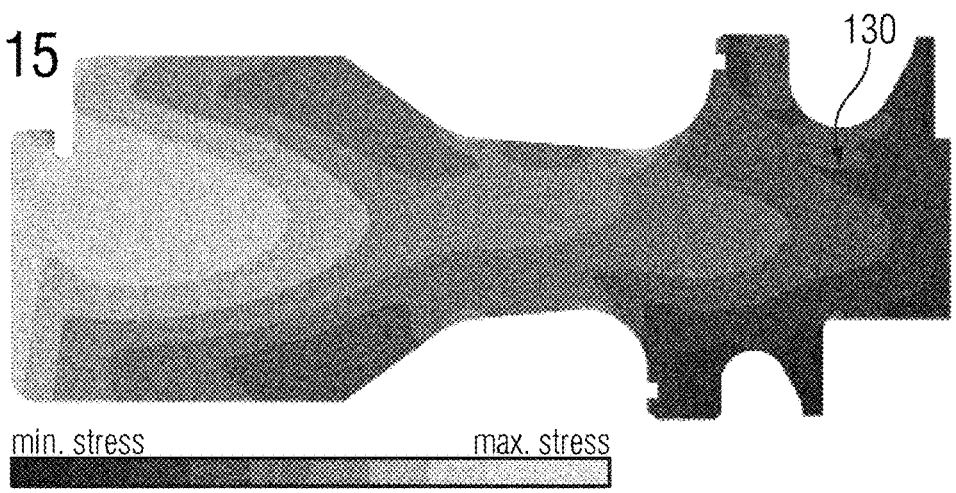
FIG. 15 illustrates a heavy-duty rotor disk modelled in 2D with a typical stress-field plot.

FIG. 14 shows a schematic of a heavy-duty rotor disk with a section from axis-symmetrical considerations, like FIG. 5 does also. In FIG. 15 the disk modelled in 2D and with a typical stress-field plot for such a component is illustrated. It is obtained from the thermo-mechanical transient Finite Element Analyses (FEA) for a specific operational profile.

The present invention can utilize very efficiently parallel computing platforms with thousands of CPUs to solve direct simulation Monte-Carlo schemes involving up to billions of individual fatigue crack growth simulations. Depending on problem size and involved number of processors the numerical solution can be obtained in minutes. It is focused on a probabilistic description of the crack formation phase and its integration into the probabilistic fatigue crack propagation to failure. The following describes a first nucleation model based on both the aforementioned experimental characterization as well as micromechanical modeling aspects.

A first forging flaw nucleation model based on numerical FEA of a simplified elliptical shaped flaw geometry is embedded in the steel matrix of the considered heavy duty gas turbine disk 130. The flaw is modelled as a pore in the center of a representative volume. The FEA cell is uni-axially loaded with a uniform stress equivalent to the load applied in the laboratory tests or resulting from the mechanical models of the component design.

Figure 16:
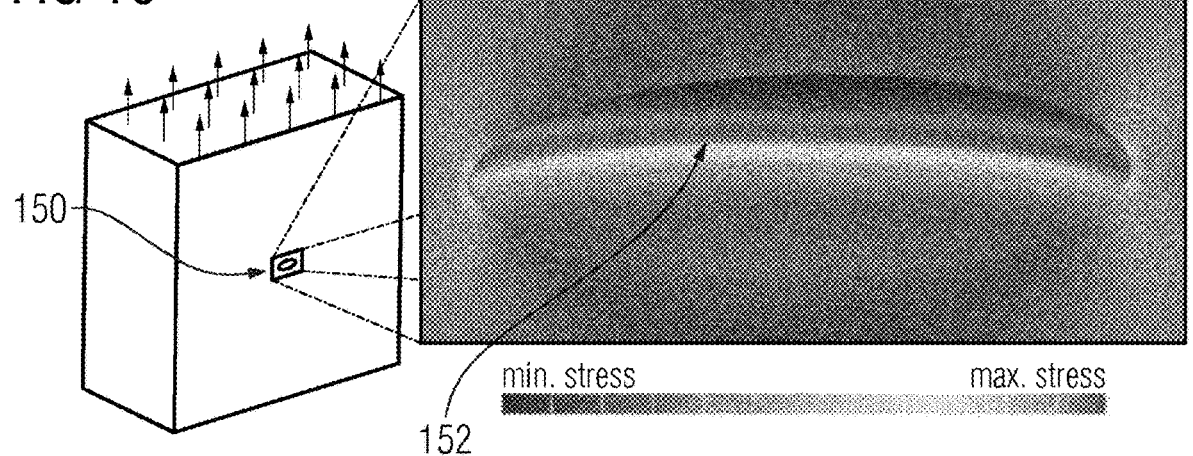
FIG. 16 shows schematically a pore within a component's material and its stress distribution.

The stress field around the pore causes micro-cracks to initiate. FIG. 16 shows an example of such a FEA performed with ANSYS. In this example the equator zone 152 of the pore 150 experiences the highest stresses due to its shape and the applied loading direction. Regions with higher stresses contribute more to crack formation and the model inherently describes the statistical size effect. Larger flaws experience a shorter nucleation life compared to smaller flaws subjected to the same cyclic load. The modelled flaw size can vary from 10 μm to 5 mm in diameter. Also, the loading ranges and the temperatures can vary, according to values relevant to rotor disks in heavy-duty gas turbines, typically from 0-900 MPa and 0-600° C. respectively.

In the nucleation model, the nucleation process is a function of the number of cycles until crack nucleation, N, the applied min/max stress, the temperature, the flaw size and geometry and the flaw type. Especially the flaw typology and geometry are subject to future studies, as they are expected to influence the nucleation life considerably. The resulting probability of crack nucleation around the flaw can, e.g., be described by a two-parameter Weibull distribution:

$$PoF^i_{Nuc}(N, \sigma, T, A) = 1 - \exp\left(-\left(\frac{N}{\eta_{\sigma,T,A}}\right)^m\right) \quad \text{eq. (14)}$$

where the shape parameter m is an inherent material property describing the scatter in LCF life and the scale parameter, η, is a geometry (A), load (σ) and temperature (T) dependent variable. This example model is valid for a specific flaw type, i.

The total flaw nucleation probability over all flaw types can be calculated with a mean type occurrence rate $p_i$ with the following formula:

$$PoF_{Nuc}(N, \sigma, T, A) = \sum_{i=1}^{n} \frac{PoF^i_{Nuc}(N, \sigma, T, A)}{\rho_i} \quad \text{eq. (15)}$$

Depending on the type of material imperfection, the component loading, and other material properties, also other models can be selected. The proposed framework needs a probabilistic description of the failure mechanisms, be it numerical or analytical. In this example, a limitation is made to one single flaw type and reduce herewith the modeling complexity.

Figure 19:
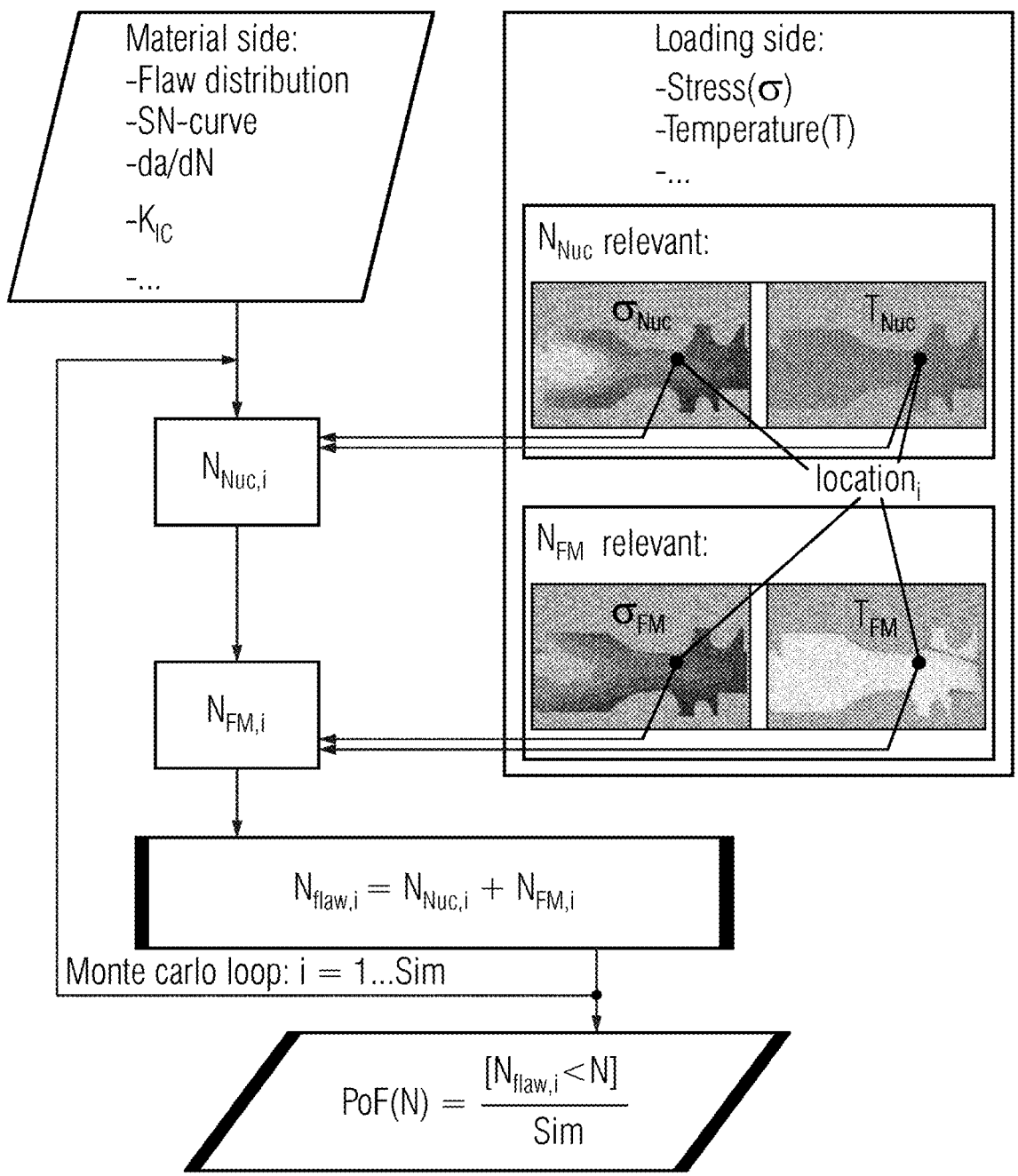
FIG. 19 shows a direct Monte-Carlo loop, in which all the statistical parameters are randomly sampled.

Both the nucleation life and the crack propagation are, on one hand, dependent of material specific parameters such as SN-curves, $$\frac{da}{dN}$$

curves, $$\frac{\sigma}{s}$$

relationships, flaw sizes and geometries and their statistical distribution along the component. On the other hand, they depend of the loading conditions, such as temperature transient and stress field. The flowchart in FIG. 19 shows the brute force Monte-Carlo loop, by which all the statistical parameters are randomly sampled. Each simulation consists of a realization of one flaw with its own nucleation life ($N_{Nuc}$) and subsequent fracture mechanical life ($N_{FM}$). The two are both locally computed and, as such, dependent of the local temperatures and stresses. By summation of the two one obtains the total lifetime of the flaw ($N_{Flaw}$). The variations in the material properties come from the scattering of material test data. The parameters on the loading side are generated with mechanical and thermal FEA. At the bottom of the flowchart the probabilistic life of the component with respect to the probability of the presence of a flaw, its nucleation and subsequent growth can be computed with eq. (16).

Figure 17:
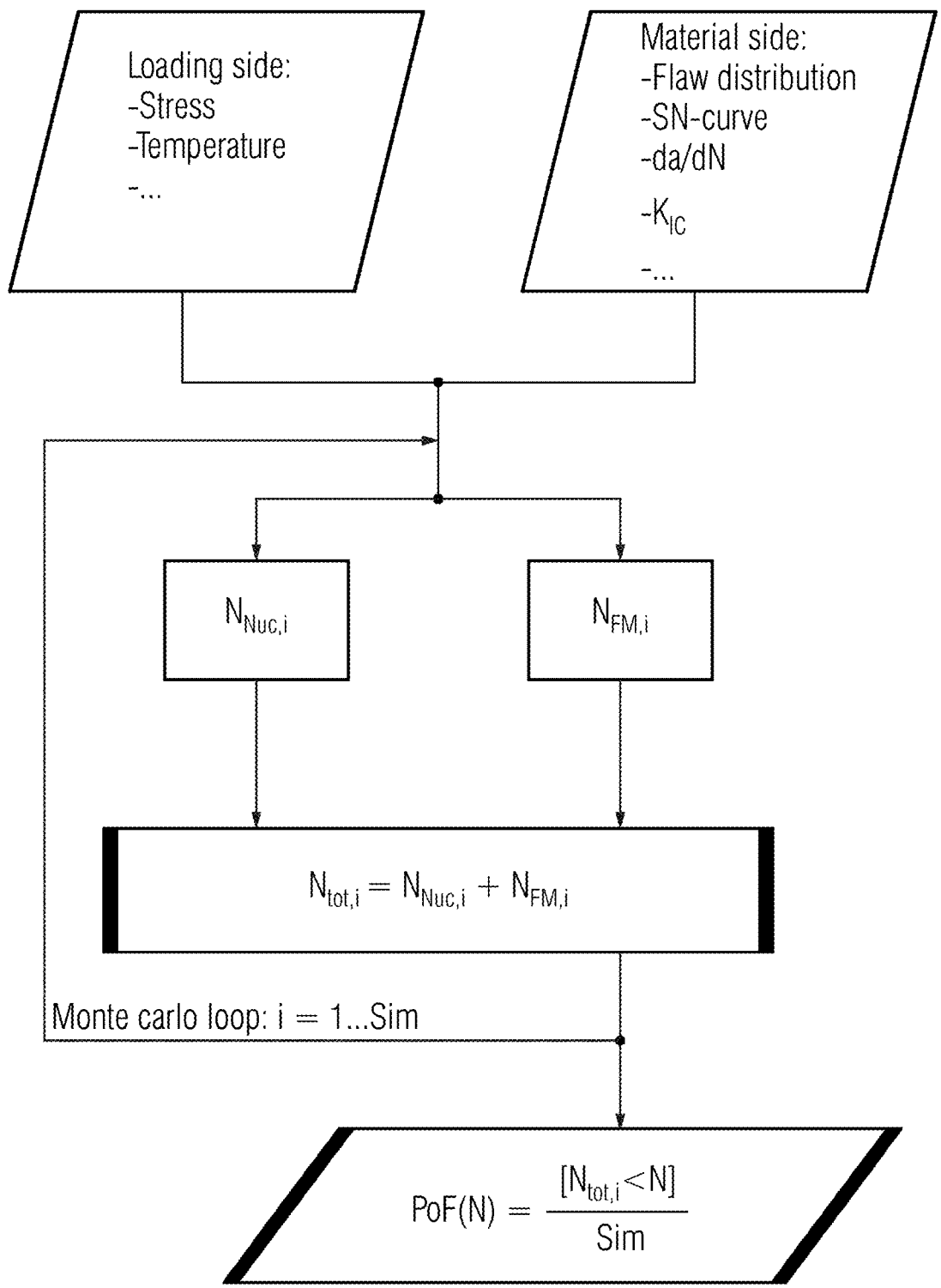
FIGS. 17, 18 shows two possible realizations of a direct Monte-Carlo approach.
Figure 18:
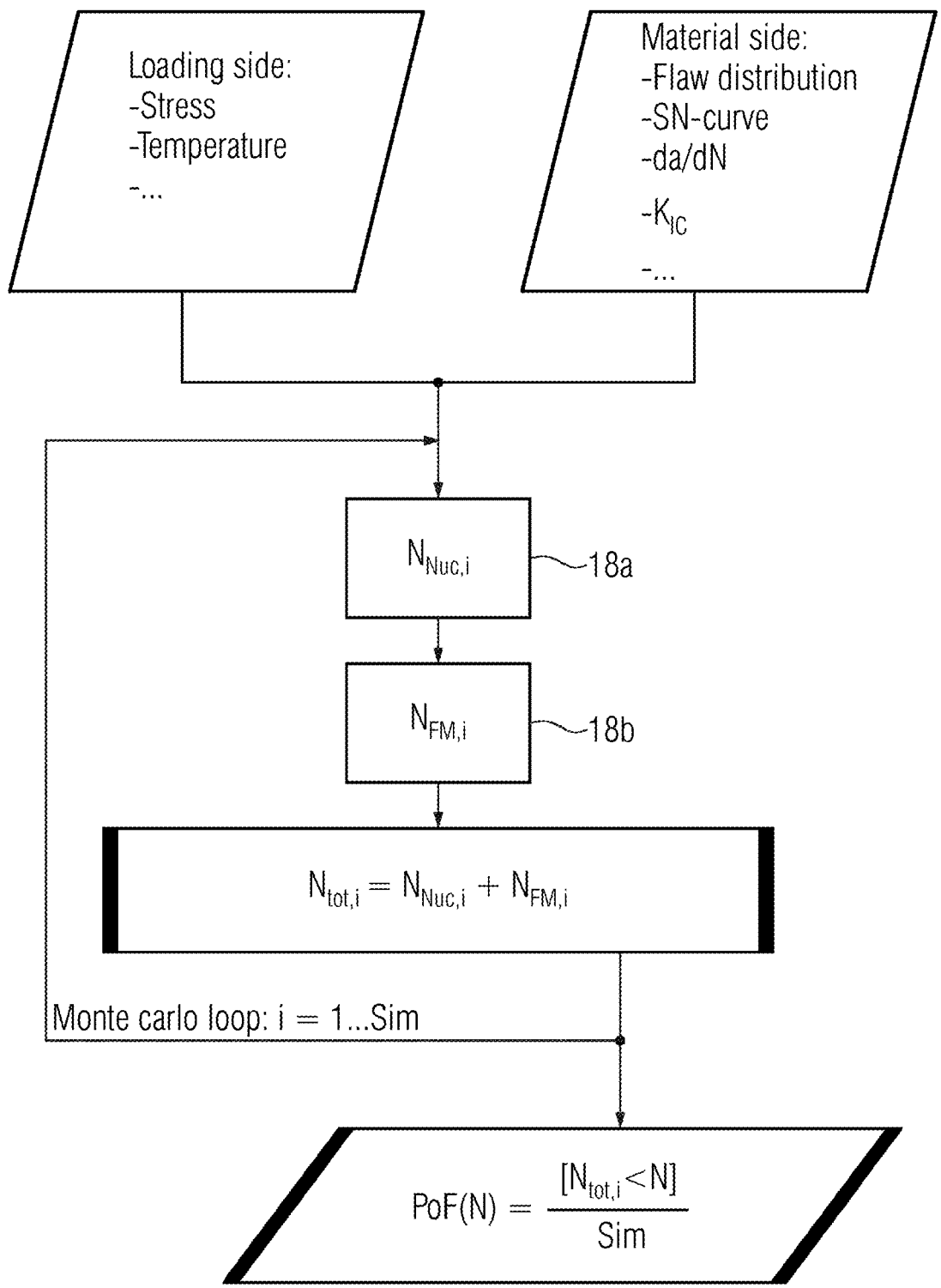

FIGS. 17 and 18 shows two possible realizations of a direct Monte-Carlo approach to realize an equivalent embodiment to the direct convolution of CDFs or PDFs. In this example the crack propagation induced failure is based on fracture mechanics (FM) considerations. The calculation of the amount of cycles for crack nucleation and crack growth can be either calculated independent in a parallel structure (FIG. 17) or dependent on the nucleation calculation in a serial structure (FIG. 18). The calculation in FIG. 17 is only applicable if the fracture mechanics part of the evaluation does not depend on the nucleation phase. This means there is no correlation between them, which then corresponds to the convolution approaches as described above. However, the calculation in FIG. 18 allows for correlations between the nucleation processes and the subsequent crack growth phase. Specifically, after a specific instance the nucleation cycle is evaluated in step 18a, the subsequent crack growth phase can then be dependent on the simulated crack nucleation process 18b. The calculation in FIG. 18 is therefore more generic. In both examples the two components the nucleation life $N_{Nuc,j}$ and the fracture mechanics life $N_{FM,j}$ can be calculated and added to a life $N_{tot,j}$ for each Monte-Carlo loop j.

The proposed process can be applied for the integration over the whole component or only over a zone or over multiple voxels of the component (not shown in FIGS. 17 and 18). Also, probabilistic input can be spatially varying, incorporate analytical and non-analytical distributions, as the proposed scheme is generically designed.

Referring back to FIG. 5 each location of the component, i.e. each domain, zone or voxel, can have different local nucleation and fracture mechanics failure probabilities. The proposed method allows for the integration over the whole component and calculate the total probability of failure for the complete component. This procedure can be performed by applying eq. (5), or directly in a Monte-Carlo loop and checking all location for failure and applying the following eq. (16) and (17).

Eq. (16) and (17) define important quantities as they are obtained from the proposed direct Monte-Carlo scheme.

$$PoF(N) = \frac{S_f(N)}{S} \qquad \text{eq. (16)}$$

Where S is the total number of simulated Monte-Carlo-Samples, and $S_f(N)$ is the number of samples that failed after N cycles. A Hazard rate H is defined by $$H(N) = \frac{PoF(N+1) - PoF(N)}{1 - PoF(N)} \qquad \text{eq. (17)}$$

where H is used as a measure for the risk of failure within the next cycle under the condition that no failure has occurred before.

FIG. 19 shows again the direct Monte-Carlo approach to realize the suggested summation of nucleation life and fracture mechanical life.

In general, the two processes of crack nucleation and crack propagation do not have the same definitions of critical temperatures and stresses along the load transient. The nucleation process e.g. is accelerated by higher temperatures and larger stress ranges. The crack growth might be limited to critical transient time points exposing a low fracture toughness for low temperatures.

Also, crack growth might be more dependent on the crack plane and stress orientation. For each process two or more different contour plots of the significant temperatures and stress ranges are obtained. FIG. 19 illustrates the overall direct MC algorithm. Each MC sample has a location i that experiences different relevant temperatures and loads for $N_{Nuc}$ and $N_{FM}$, respectively. Each MC instance has randomly assigned material properties and loading properties, whereas the convolution is established by adding the local values $N_{Nuc,i}$ and $N_{FM,i}$ to $N_{flaw,i}$. Then millions to billions of MC loops j need to be performed in order to quantify the low probabilities of failure according to eq. (7).

The total probability of failure PoF(n) of the entire component after N cycles can be computed by the weakest link theory, by which the entire component fails if one crack grows beyond critical. The following expressions define important quantities used for component lifing. The total probability of failure of the entire component could be calculated again according eq. (16).

In the first step the influence of nucleation can be studied without considering its dependence on flaw size, temperature, stress and location. Instead, effective shape and scale parameters (m and η) are selected and applied to the entire component in a global fashion. The system computes the probabilistic fracture mechanical life and, by convolution, the global nucleation life can be added to it.

The following pseudo code shows an example of a numerical Monte-Carlo method according to the beforementioned examples. The outer loop is used to traverse the number of Monte-Carlo-Sample S. The inner loop is used to traverse the number of domains N. With slight modification the inner and outer loop can be exchanged without any impacts on result and performance.

Pseudo Code:

For j=1 . . . S (outer loop; S total number of Monte-Carlo-Samples)
   Set $N_j^{Fail}$=LARGE
   For i=1 . . . N (inner loop; N number of domains of the component Ω):
      compute crack initiation cycle $N_{ij}^{CI}$ for domain i and sample j (for example by drawing from a Weibull distribution with Weibull shape and scale parameter describing domain i, see eq. (10). For some crack initiating failure mechanism, the initiation might be dominant to the surface of the component, for others it might be the volume, or both. In another example including pre-existing manufacturing related flaws such as forging flaws an occurrence probably can be utilized to probe the existence of the flaw in this domain for this instance. Once a flaw, its size and shape are established in this instance, the nucleation cycle can be established by eq. (13)-(15))
      compute fracture mechanics calculation for sample j based on fracture mechanical properties drawn from respective distributions (crack size, fatigue crack growth rate, fracture toughness, etc.). Calculate fracture life for domain i and sample j $N_{ij}^{CPF}$. Consider stress/temperature and/or geometry of fracture location for domain i. This can dependent on crack initiation process as described in the previous step in order to include correlations between the two processes Calculate cycles to failure for domain i and sample j: $N_{ij}^{Fail}=N_{ij}^{CI}+N_{ij}^{CPF}$
if $N_{ij}^{Fail}<N_j^{Fail}$ set $N_j^{Fail}=N_{ij}^{Fail}$
(this ensures that we capture the minimum failure cycle of all domains for sample j)

Calculate total probability of failure PoF(n) as a function of number of cycles n based on $S_f(n)/S$:

$$PoF(n)=S_f(n)/S$$

wherein:
$S_f(n)$=Number of samples failed until cycle n (utilize the individual failure cycles to failure $N_j^{FAIL}$ from the individual samples j. The values that have been calculated in the above nested loop.)

From the PoF(n) each relevant probabilistic/stochastic value (such as the hazard function
H(n)=[PoF(n+1)−PoF(n)]/[1−Pof(n)]]) can be calculated. In such numerical approaches enough samples S should be utilized in order to obtain converging results.

The addition of local crack initiation life $N_{ij}^{CI}$ and local crack propagation life $N_{ij}^{CPF}$ to local failure life $N_{ij}^{Fail}$ looks at a first glance deterministically. However, as this addition is embedded in inner loops of both, the local representation and within the Monte-Carlo-Simulation, this approach integrates all individual instances representing possible scenarios in operation. Hence, this could be understood as a convolution of probabilities as the uncorrelated case of both crack initiation and subsequent crack propagation induced failure. One advantage of the presented numerical method is the straightforward implementation of correlations between the two processes as described above and shown in FIG. 18.

Figure 20:
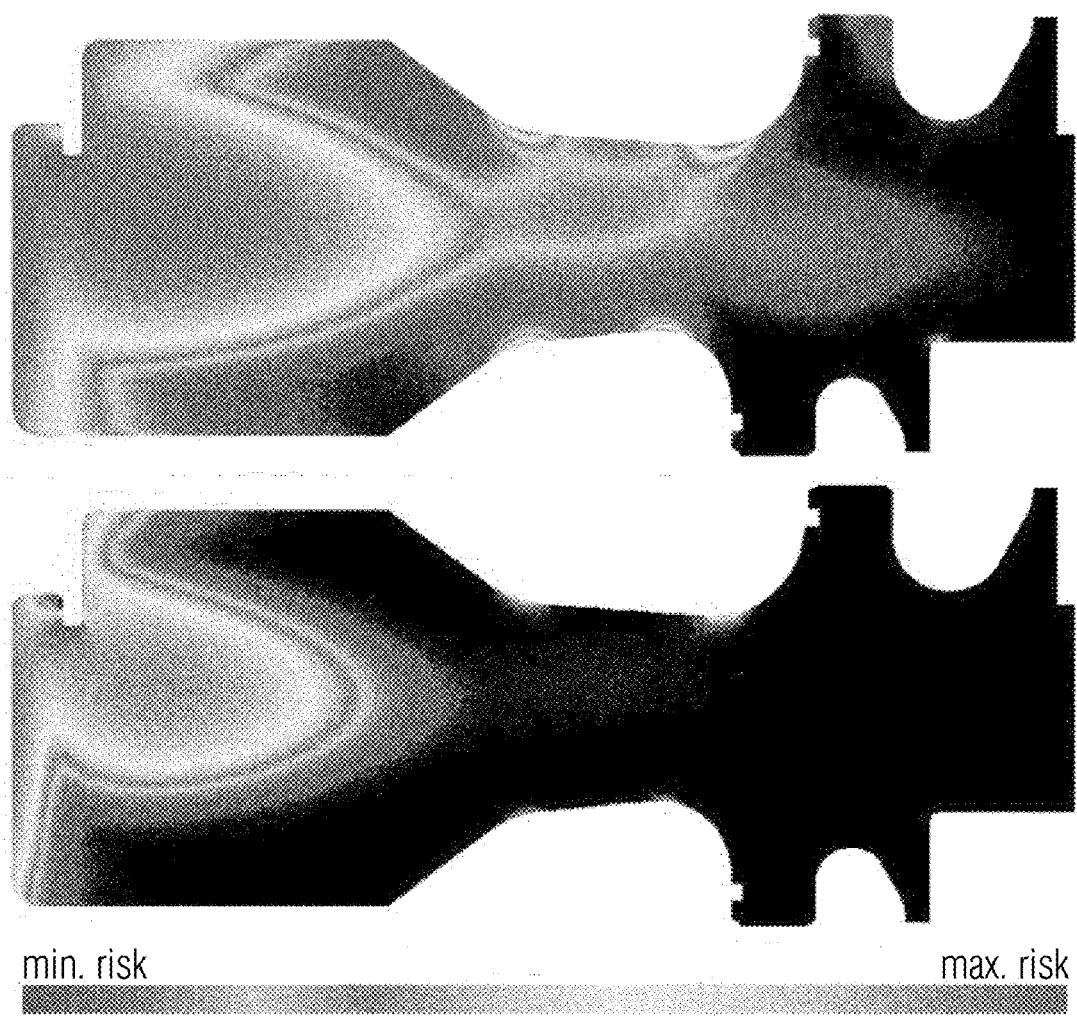
FIG. 20 shows a risk contour plot of the results of the MC loop on a case-study for a rotor disk of a gas turbine.

FIG. 20 shows a risk contour plot of the results of the MC loop on a case-study for a rotor disk of a gas turbine. For this demonstration, theoretical operational data and FEA are used as input to the simulations. The material used is a high-quality rotor steel. Each flaw that led to failure after $n_0$ load cycles is represented in these plots. Since failure from a flaw in a well-designed component is an extremely rare event, the amount of load cycles was set unrealistically high to visualize the local spread of probabilities. From these figures it results that some areas that first looked riskier, are in reality—after implementing the nucleation life—less risky.

From these local risks the global probability of failure on component level can be obtained by integration over the component and is equivalent to eq. (16).

Figure 21:
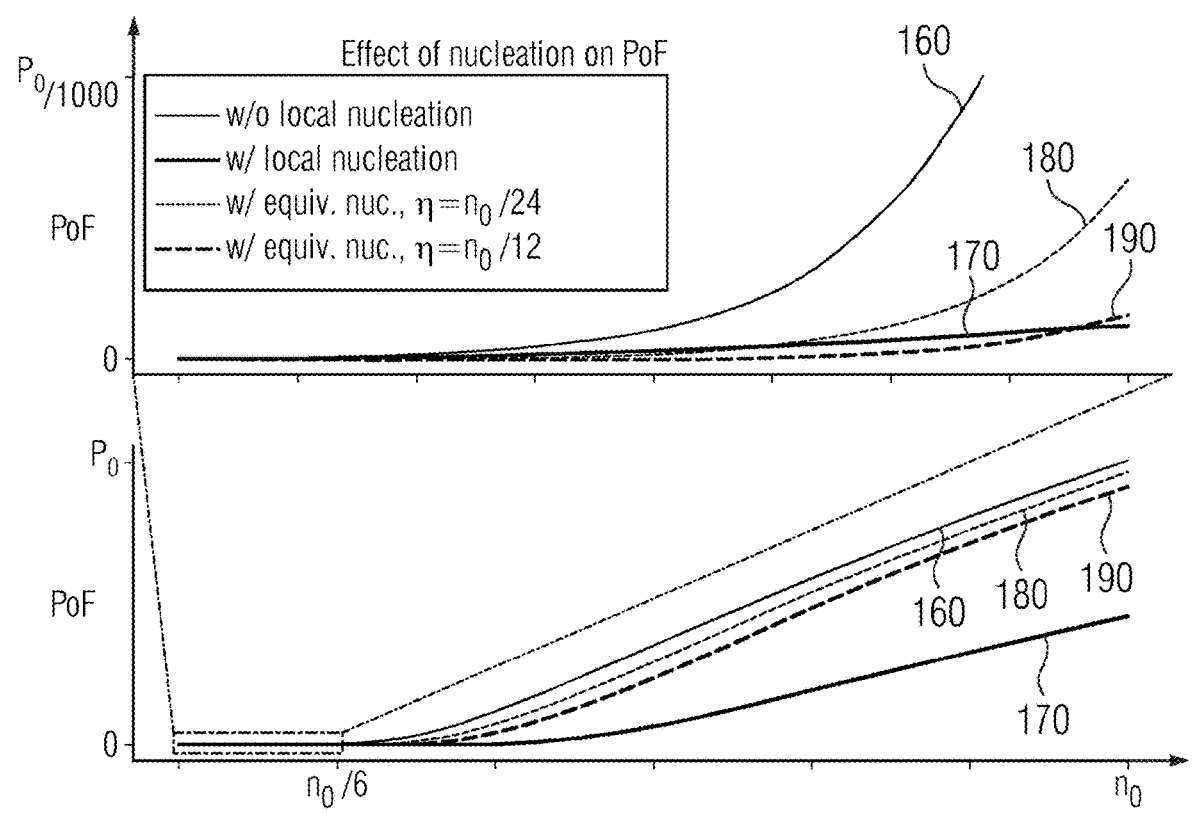
FIG. 21 shows the dependency of probabilities of failure from the number of load cycles and FIG. 22 illustrates a system 80 for fatigue crack life estimation of a component.

FIG. 21 shows the results of several computations where first no nucleation was considered (full line 160). The line 170 illustrated as bold full line 170 shows the result of computation with nucleation considered. Then different effective scale parameters η with constant shape parameter m were used. Remarkable for the total probability of failure PoF(n) for smaller number of flaws η (dashed line 180) does not lead to a significant different result for than a larger number of flaws η (bolt dashed line 190).

Infant mortality causes high rates of failure at the very begin of the lifetime. This phenomenon represents all those flaws which are sampled with disadvantageous material properties and fail after only few load cycles when no nucleation is accounted for. The effect of nucleation is that this initial peak is flattened and shifted to the right. With higher scale parameters this effect accentuates. These studies illustrate the influence of a nucleation model and the shown trends can easily be understood.

FIG. 21 shows how these probabilities develop with an increasing number of load cycles. The PoF at $n_0$ cycles of the central plot reflects the situation of FIG. 20. Also interesting are the results for lower numbers of cycles in the upper plot. For comparison also two simulations with the global effective nucleation model are plotted. The model with $\eta=n_0/12$, e.g., compares well with the local nucleation scheme at $n_0/6$ cycles, but they diverge for higher amounts of cycles. These results show the importance of modeling the nucleation life locally. Considering the nucleation life globally would overestimate the local nucleation lives in areas where, due to low stresses or temperatures, flaws eventually never nucleate, thus also never propagate.

Hence, as explained with the aid of the material flaws embedded in component's material the invention proposes a method for probabilistic estimation of the component life limited by cyclic and time dependent damage mechanisms wherein
  a probabilistic nucleation model is defined that combines an amount of local forging flaw crack nucleation processes, and
  a fracture mechanic model is defined that combines an amount of local crack growth failure probabilities, and
  convolution of the probabilistic nucleation model and the fracture mechanic model locally, and
  calculation of the total probability of failure for the hole component, and
  probabilistically predict the total life of a component under a specific load spectrum The method has been explained according to the second embodiment for the example of forging flaws. However, the presented method is generic and can be applied to many other manufacturing imperfections where a nucleation process is followed by a crack propagation phase. These examples include AM parts including a variety of imperfections including voids (or imperfectly closed voids and separations after HIP), as well as cast porosity in turbine blades. In both of those instances the flaw to be instantaneously to be a crack neglecting the nucleation (or initiation) phase. Other examples are manufacturing defects in the semiconductor industry including chipsets and boards. Here, thermos mechanical loading can initiate a crack at manufacturing defects and subsequent crack growth can eventually fail the component.

Core of the invention is the combination of a crack nucleation model for forging flaws with fracture mechanics methods in a probabilistic manner. The invention can be realized via a direct Monte-Carlo scheme or local convolution. The competitive advantage is an increase in the design lifetime of components. This method can be applied during new apparatus design as well as for lifetime extension of service frames.

Figure 22:
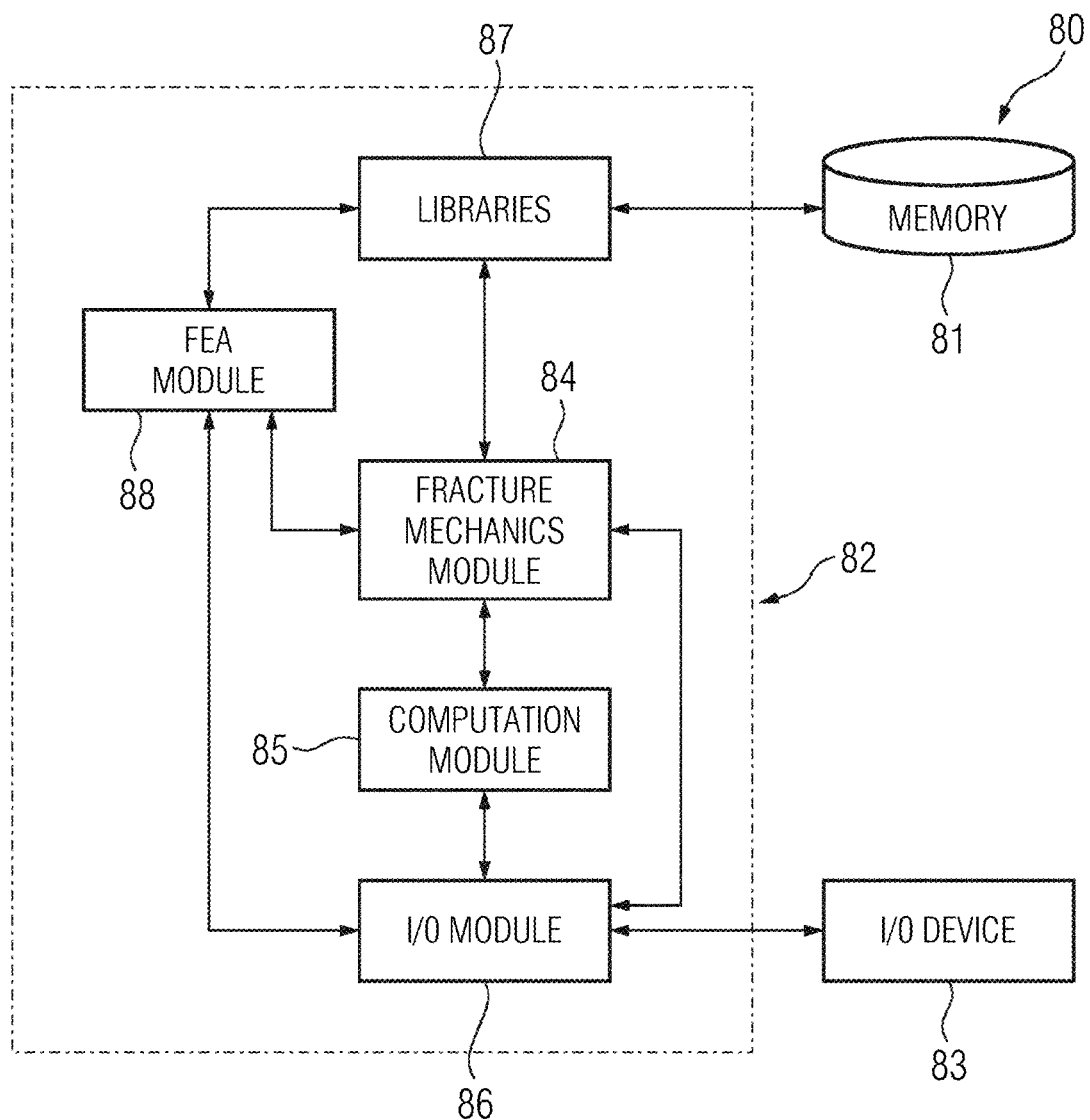

FIG. 22 schematically illustrates a system 80 for fatigue crack life estimation of a component based on direct simulation probabilistic fracture mechanics, according to one embodiment of the present invention. The illustrated system 80 is a computer system comprising a memory 81, processing means 82 and an input-output device 83. The memory 81 stores all material property scatter data, flaw-size scatter data and all other relevant data as mentioned above. Additionally, the memory 81 may also store stress-temperature fields. The processing means 82 includes a plurality of functional blocks or modules which may be implemented in hardware and/or software, typically a combination of both. These modules include a fracture mechanics module 84, an FEA module 88, a computation module 85, an I/O module 86, and a plurality of libraries 87, including libraries that handle the memory management of the stress/temperature field, libraries that handle material properties, libraries to handle NDE (such as ultrasound) and flaw information, and high performance look-up table libraries. The libraries may be linked together into an executable.

In detail the computation module 85 is able to support and/or execute the method steps described herein.

In brief the invention relates to a computer-implemented method 100 for probabilistic estimation of probability of failure PoF(n) of a component, especially a gas turbine component, which during operation is subjected to cyclic stress, wherein the component is divided virtually in one or more domains i, the method comprising the steps of: providing or determining 104 for at least one domain, preferably for each domain, a domain probability density function for crack initiation $PDF^{CI}_i$ and providing or determining 106 for the considered domains a domain probability density function for subsequent crack propagation induced fracture $PDF^{CPF}_i$. For providing an improved method for probabilistic estimation of a probability of failure of a component, especially a gas turbine component, designated for being subjected to cyclic stress, it is proposed to determine for each considered domain a combined domain cumulative distribution function for failure $CDF^{Fail}_i$ or its probability density function $PDF^{Fail}_i$ by convoluting either the considered domain probability density function for crack initiation $PDF^{CI}_i$ and the considered domain probability density function for subsequent crack propagation induced failure $PDF^{CPF}_i$, or their integral functions $CDF^{CI}_i$ and $CDF^{CPF}_i$. Also, correlations between the crack initiation and subsequent crack propagation can be incorporated if needed.

The method described herein is explained on the basis of a turbine blade and rotor disk. However, the method can be applied to all components where failure due to an initiation event and subsequent (crack) progression is relevant. Components include but are not limited to gas turbines, steam turbine, generators and their components like blades, vanes, transitions, vane carrier, rotor disks, casing components, electrical conductors or electrical connections or the like.

While specific embodiments have been described in detail, those with ordinary skill in the art will appreciate that various modifications and alternatives to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A computer-implemented method for probabilistic estimation of probability of failure PoF(n) of a component, especially a gas turbine component, which during operation is subjected to cyclic stress, wherein the component is divided virtually in multiple domains, the method comprising:
   a. providing or determining for at least one domain, preferably for each domain, a domain probability density function for crack initiation $PDF^{CI}_i(n)$ and providing or determining for the considered domains a domain probability density function for subsequent crack propagation induced failure $PDF^{CPF}_i(n)$,
   b.
      b1) determining for each considered domain a combined domain probability density function for failure $PDF^{Fail}_i(n)$ according to $$PDF^{Fail}_i(n) = PDF^{CI}_i(n) \times PDF^{CPF}_i(n),$$

wherein X designates a convolution operator between the two PDFs, and b2) determining for each considered domain a combined domain cumulative distribution function for failure $CDF^{Fail}_i(n)$ based on the respective combined domain probability density function for failure $PDF^{Fail}_i(n)$, wherein the CDF is a cumulative distribution function of the PDF,
      OR
      b3) determining for each considered domain a domain cumulative distribution function for crack initiation $CDF^{CI}_i(n)$ and cumulative distribution function for subsequent crack propagation induced failure $CDF^{CPF}_i(n)$ based on the respective domain probability density function for crack initiation $PDF^{CI}_i(n)$ and subsequent crack propagation induced failure $PDF^{CPF}_i(n)$, and b4) determining for each considered domain a combined domain probability density function for $CDF^{Fail}_i(n)$ according to $$CDF^{Fail}_i(n) = \frac{d}{dn}(CDF^{CI}_i(n) X CDF^{CPF}_i(n)),$$

wherein—$CDF^{CI}_i(n)$ designates the domain cumulative distribution function for crack initiation, —$CDF^{CPF}_i(n)$ designates the domain cumulative distribution function for subsequent crack propagation induced failure, —X designates the convolution operator between the two CDFs,
   c. determining (110) the total probability of failure PoF(n) of the component according to $$PoF(n) = CDF^{Fail} = 1 - \Pi_{i=1}^{N}[1 - CDF^{Fail}_i(n)],$$

wherein a step of determining crack propagation data either as each considered domain as domain probability density function for subsequent crack propagation induced failure $PDF^{CPF}_i(n)$ or as crack propagation cycle $N^{CPF}_{ij}$ considers at least one of crack growth and failure relevant material properties comprising fatigue growth rate FCGR, creep crack growth rate CCGR, crack corrosion pitting, erosion rate-fracture toughness $K1_c$, $\Delta K_{threshold}$, or tensile properties or any combination thereof,
   with a failure criterion which is based on at least one of stress intensity factor K exceeding the fracture toughness $K1_c$, $\Delta K$ exceeding, stress intensity factor range $\Delta K$ exceeding a fatigue crack growth stress intensity range threshold $\Delta K_{threshold}$, a crack length exceeding a critical crack length or exceeding a safe region of a two parameter failure assessment diagram (FAD) based on properties listed above, especially based on British R6 criteria which are based on two parameters load ratio Lr and a fracture ratio Kr, and
   wherein a step of defining of domains of the component comprises a definition of a number of domains of equally sized voxels or the step of defining of domains of the component comprises the definition of a number of domains, wherein each domain represents a zone of different functions of the component.

2. The method according to claim 1,
wherein the step of determining crack initiation data either as each considered domain a domain probability density function for crack initiation $PDF^{CI}_i(n)$ or as crack initiation cycle $N_{ij}^{CPF}$ is based on at least of one of Low-Cycle fatigue (LCF), High-Cycle fatigue (HCF), Thermo-Mechanical fatigue (TMF), creep crack propagation or oxidation or the like or any combination thereof.

3. The method according to claim 2,
wherein the step of determining for each considered domain a domain probability density function for crack initiation $PDF^{CI}_i(n)$ is based on a stochastic distribution, especially a Weibull distribution, or on a result of a numeric simulation, especially a Monte-Carlo-Simulation.

4. The method according to claim 1,
wherein the crack formation in surface regions is mainly considered by $$\eta = \left( \int_A \frac{1}{N_{det}^m} dA \right)^{-\frac{1}{m}}.$$

5. The method according to claim 1,
wherein the component is embodied as one of the group of blades, vanes, vane carrier, rotor disk, especially its hub region or attachment region for attaching rotor blade, casing components of either a gas turbine, of a steam turbine or of a generator or as a combustor transitions of a gas turbine.

6. The method according to claim 1,
wherein the crack initiation process considers surface related defects of the component and/or nucleating flaws located below the components surface.

7. A method for operating a component under cyclic stress, comprising:
scheduling a downtime or maintenance of said component considering a probability of failure PoF(n) of said component as estimated by the method according to claim 1.

8. A non-transitory computer-readable storage medium, comprising:
instructions stored thereon which, when executed by a computer, cause the computer to carry out the method of claim 1.

9. A computer-implemented method for probabilistic estimation of probability of failure PoF(n) of a component, especially a gas turbine component, which during operation is subjected to cyclic stress, wherein the component is divided virtually in multiple domains i, wherein N is a number of domains, the step of defining of domains of the component comprises a definition of a number of domains of equally sized voxels on a step of defining of domains of the component comprises the definition of a number of domains, wherein each domain represents a zone of different functions of the component, the method comprising:
providing data regarding material of the component, its structure and regarding a loading of the component,
defining a number S of Monte-Carlo-Samples j for a Monte-Carlo-Simulation,
providing nested loops, in particular an outer loop and an inner loop, to traverse the domains N and the Monte-Carlo-Samples S, wherein in particular the outer loop traverses through the one of both samples S and domains N and the inner loop traverses through the other of the both the samples S and the domains N,
determining within both the inner loop and the outer loop a crack initiation cycle to failure $N_{ij}^{CI}$,
determining within both the inner loop and the outer loop a subsequent crack propagation cycle to failure $N_{ij}^{CPF}$ for domain i and for sample j, especially based on fracture mechanical properties drawn from respective distributions and considering stress/temperature and geometry of fracture location for domain j,
calculating within both the inner loop and the outer loop the cycles to failure for domain i and sample j: $N_{ij}^{Fail} = N_{ij}^{CI} + N_{ij}^{CPF}$,
determining minimum failure cycle of all domains for sample j, especially according to: if $N_{ij}^{Fail} < N_j^{Fail}$ set $N_j^{Fail} = N_{ij}^{Fail}$, and calculating a total probability of failure PoF(n) as a function of cycles n based on $S_f(n)/S$, wherein $S_f(n)$ =Number of samples failed until cycle n,
wherein a step of determining crack propagation data either as each considered domain a domain probability density function for subsequent crack propagation induced failure $PDF^{CPF}_i(n)$ or as crack propagation cycle $N_{ij}^{CPF}$ considers at least one of crack growth and failure relevant material properties such as fatigue crack growth rate FCGR, creep crack growth rate CCGR, crack corrosion pitting, erosion rates, fracture toughness $K1_c$, $\Delta K_{threshold}$, or tensile properties or any combination thereof,
with a failure criterion which can be based on at least one of stress intensity factor K exceeding the fracture toughness $K1_c$, $\Delta K$ exceeding, stress intensity factor range $\Delta K$ exceeding a fatigue crack growth stress intensity range threshold $\Delta K_{threshold}$, a crack length exceeding a critical crack length or exceeding a safe region of a two parameter failure assessment diagram (FAD) based on properties listed above, especially based on British R6 criteria which are based on two parameters load ratio Lr and the fracture ratio Kr.

10. The method according to claim 9,
wherein the step of determining crack initiation data either as each considered domain a domain probability density function for crack initiation $PDF^{CI}_i(n)$ or as crack initiation cycle $N_{ij}^{CPF}$ is based on at least of one of Low-Cycle fatigue (LCF), High-Cycle fatigue (HCF), Thermo-Mechanical fatigue (TMF), creep crack propagation or oxidation or any combination thereof.

11. The method according to claim 10,
wherein the step of determining for each considered domain a domain probability density function for crack initiation $PDF^{CI}_i(n)$ is based on a stochastic distribution, especially a Weibull distribution, or on a result of a numeric simulation, especially a Monte-Carlo-Simulation.

12. The method according to claim 9,
wherein the crack formation in surface regions is mainly considered by $$\eta = \left( \int_A \frac{1}{N_{det}^m} dA \right)^{-\frac{1}{m}}.$$

13. The method according to claim 9,
wherein the component is embodied as one of the group of blades, vanes, vane carrier, rotor disk, especially its hub region or attachment region for attaching rotor blade, casing components of either a gas turbine, of a steam turbine or of a generator or as a combustor transitions of a gas turbine.

14. The method according to claim 9,
wherein the crack initiation process considers surface related defects of the component and/or nucleating flaws located below the components surface.

15. A method for operating a component under cyclic stress, comprising:
scheduling a downtime or maintenance of said component considering a probability of failure PoF(n) of said component as estimated by the method according to claim 9.

16. A non-transitory computer-readable storage medium, comprising:
instructions stored thereon which, when executed by a computer, cause the computer to carry out the method of claim 9.

* * * * *

UNITED STATES PATENT AND TRADEMARK OFFICE
CERTIFICATE OF CORRECTION

Page 1 of 1

PATENT NO. : 12,197,825 B2
APPLICATION NO. : 17/288948
DATED : January 14, 2025
INVENTOR(S) : Francesco Radaelli et al.

It is certified that error appears in the above-identified patent and that said Letters Patent is hereby corrected as shown below:

In the Claims

Claim 1, Column 22, Line 37, remove [(110)];

Claim 1, Column 22, Lines 47 - 48, remove [fatigue growth rate] and insert -- fatigue crack growth rate --.

Signed and Sealed this
Sixth Day of May, 2025

Coke Morgan Stewart
*Acting Director of the United States Patent and Trademark Office*